(12) United States Patent
Yoo

(10) Patent No.: US 9,486,100 B2
(45) Date of Patent: Nov. 8, 2016

(54) APPARATUS FOR COATING KITCHEN VESSEL

(71) Applicant: SESHIN Industry. INC, Gyeonggi-do (KR)

(72) Inventor: Moon Geun Yoo, Gyeonggi-do (KR)

(73) Assignee: SESHIN Industry, Inc., Gyeonggi-do (KR)

( * ) Notice: Subject to any disclaimer, the term of this patent is extended or adjusted under 35 U.S.C. 154(b) by 150 days.

(21) Appl. No.: 13/890,014

(22) Filed: May 8, 2013

(65) Prior Publication Data
US 2014/0096714 A1    Apr. 10, 2014

(30) Foreign Application Priority Data

May 16, 2012 (KR) .......................... 10-2012-0052136

(51) Int. Cl.
| A47J 27/00 | (2006.01) |
| B05C 9/00 | (2006.01) |
| B05C 9/02 | (2006.01) |
| B05C 9/12 | (2006.01) |
| A47J 36/02 | (2006.01) |
| B05B 5/08 | (2006.01) |

(52) U.S. Cl.
CPC .............. A47J 27/002 (2013.01); A47J 36/02 (2013.01); B05B 5/082 (2013.01); B05C 9/022 (2013.01); B05C 9/12 (2013.01)

(58) Field of Classification Search
None
See application file for complete search history.

(56) References Cited

U.S. PATENT DOCUMENTS

2005/0287306 A1*  12/2005  Hays et al. .................... 427/458

FOREIGN PATENT DOCUMENTS

KR       10-1140588     *  5/2012   ............. B05B 13/02

OTHER PUBLICATIONS

KR101140588 B1 (May 12, 2012) Abstract and draswstrings from application—Inventor(s): You Moon Kun [KR] + (You, Moon Kun); Applicant(s): Seshin Industry Inc [KR] + (Seshin Industry. Inc).

* cited by examiner

Primary Examiner — Dah-Wei D Yuan
Assistant Examiner — Jethro M Pence
(74) Attorney, Agent, or Firm — WRB-IP LLP

(57) ABSTRACT

Disclosed is an apparatus for coating kitchen vessels which uses magnetic force of a magnet to which a metal plate is applied to be magnetized by the magnetic force, and thus can produce clearer stereoscopic patterns on a vessel in an overlapping manner by causing the magnetic force according to the magnetizing force of the metal plate to be maximized to be as strong as the magnetic force of the magnet by disposing the magnet on a jig to allow the metal plate to overlap with the magnet to be magnetized by actively receiving magnetic force from the magnet.

15 Claims, 21 Drawing Sheets

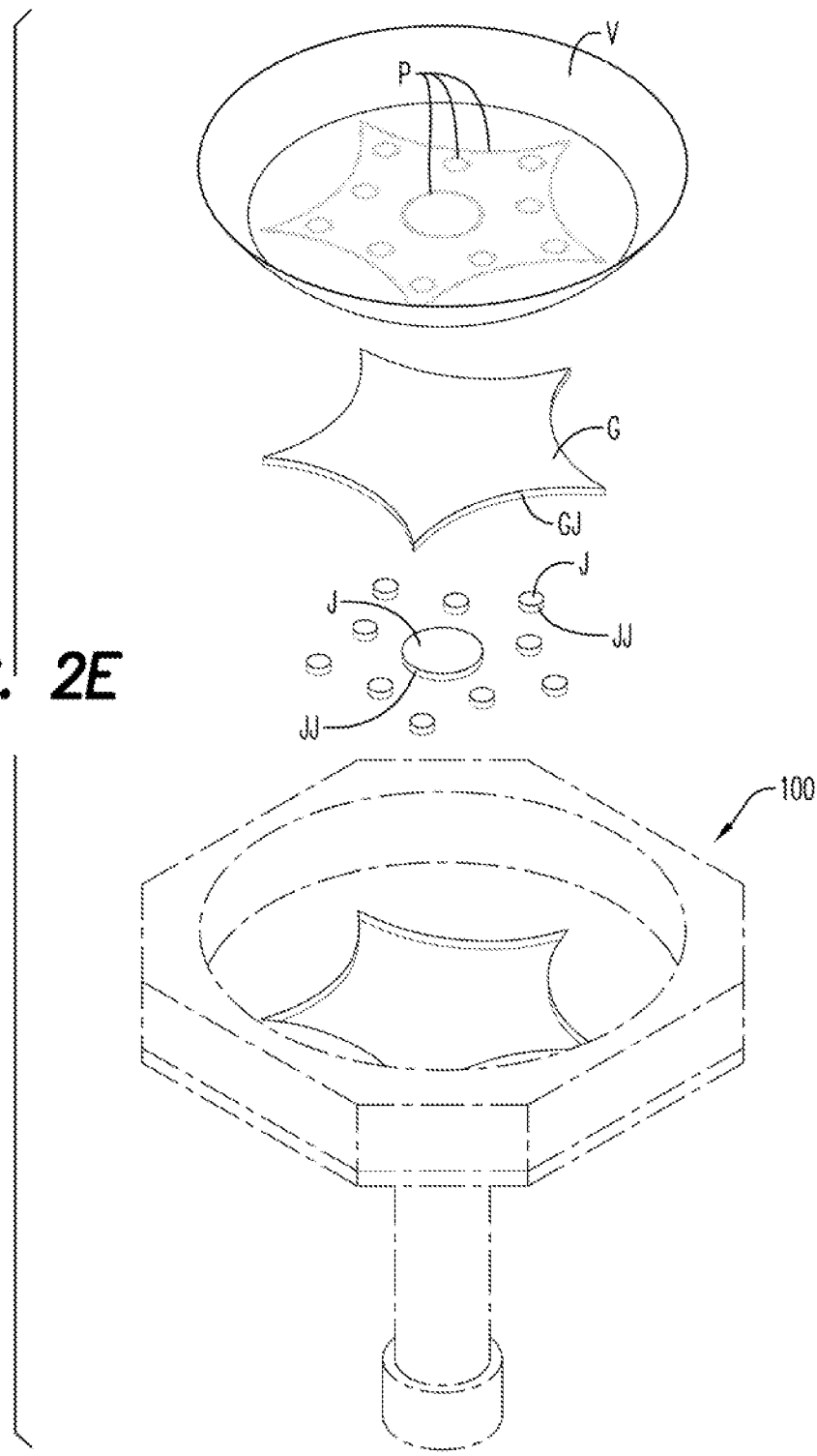

APPARATUS FOR COATING KITCHEN VESSEL

BACKGROUND AND SUMMARY

The present invention relates to an apparatus for coating kitchen vessels, and more particularly to an apparatus for coating kitchen vessels which applies magnetic force to a coating substance containing magnetic particles to cause overlapping concentration of the magnetic particles and thereby producing flamboyant and luxurious stereoscopic patterns on a vessel.

Kitchen vessels generally include a frying pan, a wok, a pot and a casserole pan which are used to broil or boil food. Such a kitchen vessel is manufactured by preparing a vessel to contain food, cutting or grinding rough, surfaces of the vessel, and then performing a coating or anodizing process to prevent food from sticking to the vessel and prevent the vessel from being scratched by external contact.

The coating process generally includes primer coating, intermediate coating, and top coating. In this process, a fluorine resin coating, ceramic coating, Teflon coating, or titanium coating may be applied to the vessel. During this process, a pattern may be transferred to the vessel through a transfer sheet, or various patterns may be printed on the vessel through rubber stamps.

The present invention proposes a jig to utilize a magnet which, allows a three dimensional stereoscopic pattern to be applied to the surface or back surface of a vessel during a coating process such as primer coating, intermediate coating, or top coating.

FIG. 1A is an exploded perspective view illustrating a vessel V and a jig for coating kitchen vessels according to an embodiment of Korean Patent Application Publication No. 10-2013-0042732 (JIG FOR COATING KITCHEN CONTAINER), and FIG. 1B is a perspective view illustrating the vessel V and the jig for coating kitchen vessels according to the illustrated embodiment of Korean Patent Application Publication No. 10-2011-0042732. Reference numeral 20 indicates an outer support 20 fixed to a prop 10 to support the outer lateral surface of the vessel V.

The jig for coating kitchen vessels according to the illustrated embodiment of Korean Patent Application Publication No. 10-2011-0042732 includes a jig J provided with a magnet M set thereon to support a vessel V to which a coating substance containing magnetic particles is applied.

The magnet M is set on the jig J to face the vessel V, and metal segments M1 which are magnetized by the magnet M are arranged around the magnet M.

The magnet M and the metal segments M1 may be pre-attached to a separate synthetic resin film before being set on the jig J. Alternatively, the magnet M and the metal segments M1 may be fixed to individual jigs J to face the vessel V.

Preferably, the jig J includes a prop 10 provided with a fixing groove 11 allowing the magnet M to be inserted thereinto, and coupling grooves 12 provided around the fixing groove 11 on the upper portion of the prop 10 to allow the metal segment M1 magnetized by the magnet M to be inserted thereinto.

The metal segments M1 are magnetized by magnetic force of the magnet M. The magnetic force produced by the metal segment M1, which is less strong than that of the magnet M, causes magnetic particles, on the surface of the vessel V to be concentrated. Thereby, concentration of magnetic particles by strong magnetism of the magnet M and the concentration of magnetic particles by weak magnetism of the metal segments M1 mingle together to produce more various flamboyant stereoscopic patterns IP.

However, for Korean Patent Application Publication No. 10-2011-0042732, the metal segments M1 are simply arranged around the magnet M, and thus fail to sufficiently receive magnetic force of the magnet M. Therefore, Korean Patent Application Publication No. 10-2011-0042732 has a limit in maximizing magnetizing force.

In addition, for Korean Patent Application Publication No. 10-2011-0042732, the metal segments M1 and the magnet M are disposed in a plane. That is, the metal segments M1 and the magnet M are disposed neighboring each other, and therefore stereoscopic patterns IP are arranged neighboring each other in a plane. As a result, Korean Patent Application Publication No. 10-2011-0042732 has a limit in producing various flamboyant three-dimensional stereoscopic patterns IP.

Therefore, the present invention has been made in view of the above problems, and it is desirable to provide an apparatus for coating kitchen vessels which can produce clear stereoscopic patterns on a vessel in an overlapping manner by disposing a magnet on a jig to overlap with a metal plate such that the metal plate is magnetized by actively accepting magnetic force of the magnet, and thereby the magnetic force according to magnetizing force of the metal plate is maximized to be as strong as the magnetic force of the magnet.

It is desirable to provide an apparatus for coating kitchen vessels which can produce stereoscopic patients having different degrees of clarity on a vessel in an overlapping manner by maximizing the clarity of stereoscopic patterns formed by a magnetic pole of the magnet producing strong magnetic force and lowering the clarity of stereoscopic patterns formed by a magnetic pole of the metal producing relatively weak magnetic force.

It is desirable to provide an apparatus for coating kitchen vessels which can produce clear stereoscopic patterns on a vessel in an overlapping manner by causing a magnetic pole of a metal to produce a magnetic force as strong as the magnetic force of a magnet pole of a magnet to produce clear stereoscopic patterns.

It is desirable to provide an apparatus for coating kitchen vessels which can produce clear stereoscopic patterns having various degrees of clarity on a vessel in an overlapping manner by overlapping a magnetic pole of a magnet producing strong magnetic force and magnetic poles of a first metal plate and a second metal plate producing different weak magnetic forces.

It is desirable to provide an apparatus for coating kitchen vessels which has magnetic poles of a metal plate formed not only at an end portion, i.e., an edge of the metal plate but also at an end portion of a pattern hole and thereby can produce various stereoscopic patterns on a vessel in an overlapping manner according to the number and shape of the pattern holes.

It is desirable to provide an apparatus for coating kitchen vessels which can produce clear and various stereoscopic patterns on a vessel in an overlapping manner as other magnets are disposed on or under a metal plate to overlap with the metal plate.

It is desirable to provide an apparatus for coating kitchen vessels which can produce various clear stereoscopic patterns on a vessel by overlapping a magnetic pole of a magnet having strong magnetic force produced by the magnet with magnetic poles of other metal plates having different weak magnetic forces produced by the other metal plates.

It is desirable to provide an apparatus for coating kitchen vessels which includes a metal plate provided with a through hole (a magnet may be fitted into the through hole, may be placed in the through hole formed to be larger than the magnet, or may be positioned under or on the through hole formed to be smaller than tire magnet) and adapted to be magnetized and apply magnetic force to the coating substance to cause the magnetic particles to be concentrated at a magnetic pole of the metal plate formed at an end portion of the metal plate, and thereby can produce clearer stereoscopic patterns on the vessel V in an overlapping manner as the magnetic force according to the magnetizing force of the metal plate is maximized to be as strong as the magnetic force of the magnet.

It is desirable to provide an apparatus for coating kitchen vessels which has a magnet disposed on or under another magnet in an overlapping manner, and thus can produce clear stereoscopic patterns in a overlapping manner according to magnetic poles formed at respective end portions of the magnets, thereby greatly improving commercial value of a product.

It is desirable to provide an apparatus for coating kitchen vessels which can maximize the magnetizing force of a metal plate and produce various stereoscopic patterns on a vessel in an overlapping manner according to a magnetic pole of the metal plate.

It is desirable to provide an apparatus for coating kitchen vessels which allows a magnetic pole formed at an end portion of a metal plate to be coordinated with another magnetic pole of the metal plate formed around a pattern hole, thereby producing various stereoscopic patterns on a vessel in an overlapping manner.

It is desirable to provide an apparatus for coating kitchen vessels which has a magnet simply disposed on a jig and another magnet disposed on or under a metal plate to overlap with the metal plate, and thus can produce simple stereoscopic patterns and complex stereoscopic patterns together on a vessel in an overlapping manner, thereby greatly improving commercial value of a product.

In accordance with an aspect of the present invention, an apparatus is provided for coating kitchen vessels including a jig facing a vessel to which a coating substance containing magnetic particles is applied, the apparatus including a magnet set on the jig to face the vessel and adapted to apply magnetic force to the coating substance to cause the magnetic particles to be concentrated at a magnetic pole of the magnet formed at an end portion of the magnet, and a metal plate overlapping with the magnet to be magnetized and thereby apply magnetic force to the coating substance to cause the magnetic particles to be concentrated at a magnetic pole of the metal plate formed at an end portion of the metal plate.

In accordance with another aspect of the present invention, there is provided an apparatus for coating kitchen vessels including a jig facing a vessel to which a coating substance containing magnetic particles is applied, the apparatus including a magnet set on the jig to face the vessel and adapted to apply magnetic force to the coating substance to cause the magnetic particles to be concentrated at a magnetic pole of the magnet formed at an end portion of the magnet, and a metal plate provided with a through hole facing the magnet to be magnetized and thereby apply magnetic force to the coating substance to cause the magnetic particles to be concentrated at a magnetic pole of the metal plate formed at an end portion of the metal plate.

In accordance with another aspect of the present invention, there is provided an apparatus for coating kitchen vessels including a jig facing a vessel to which a coating substance containing magnetic particles is applied, the apparatus including a magnet set on the jig to face the vessel and adapted to apply magnetic force to the coating substance to cause the magnetic particles to be concentrated at a magnetic pole of the magnet formed at an end portion of the magnet, and another magnet disposed on or under the magnet to overlap with the magnet to apply magnetic force to the coating substance to cause the magnetic particles to be concentrated at another magnetic pole formed at an end portion of the another magnet.

In accordance with another aspect of the present invention, there is provided an apparatus for coating kitchen vessels including a jig facing a vessel to which a coating substance containing magnetic particles is applied, the apparatus including a magnet set on the jig to face the vessel and adapted to apply magnetic force to the coating substance to cause the magnetic particles to be concentrated at a magnetic pole of the magnet formed at an end portion of the magnet, another magnet disposed around the magnet and set on the jig to face the vessel to apply magnetic force to the coating substance to cause the magnetic particles to be concentrated at another magnetic pole formed at an end portion of the another magnet, and a metal plate overlapping with the another magnet to be magnetized and thereby apply magnetic force to the coating substance to cause the magnetic particles to be concentrated at a magnetic pole of the metal plate formed at an end portion of the metal plate.

BRIEF DESCRIPTION OF THE DRAWINGS

The above and other objects, features and other advantages of the present invention will be more clearly understood from the following detailed description of preferred embodiments of an apparatus for coating kitchen vessels according to the present invention taken in conjunction with the accompanying drawings, in which:

FIG. 2E is an exploded, top perspective view of another embodiment of the apparatus for coating kitchen vessels according to the first aspect of the present invention;

FIG. 68 is an exploded, top perspective view of another embodiment of the apparatus for coating kitchen vessels according to the third aspect of the present invention;

DETAILED DESCRIPTION

Figure 1A:
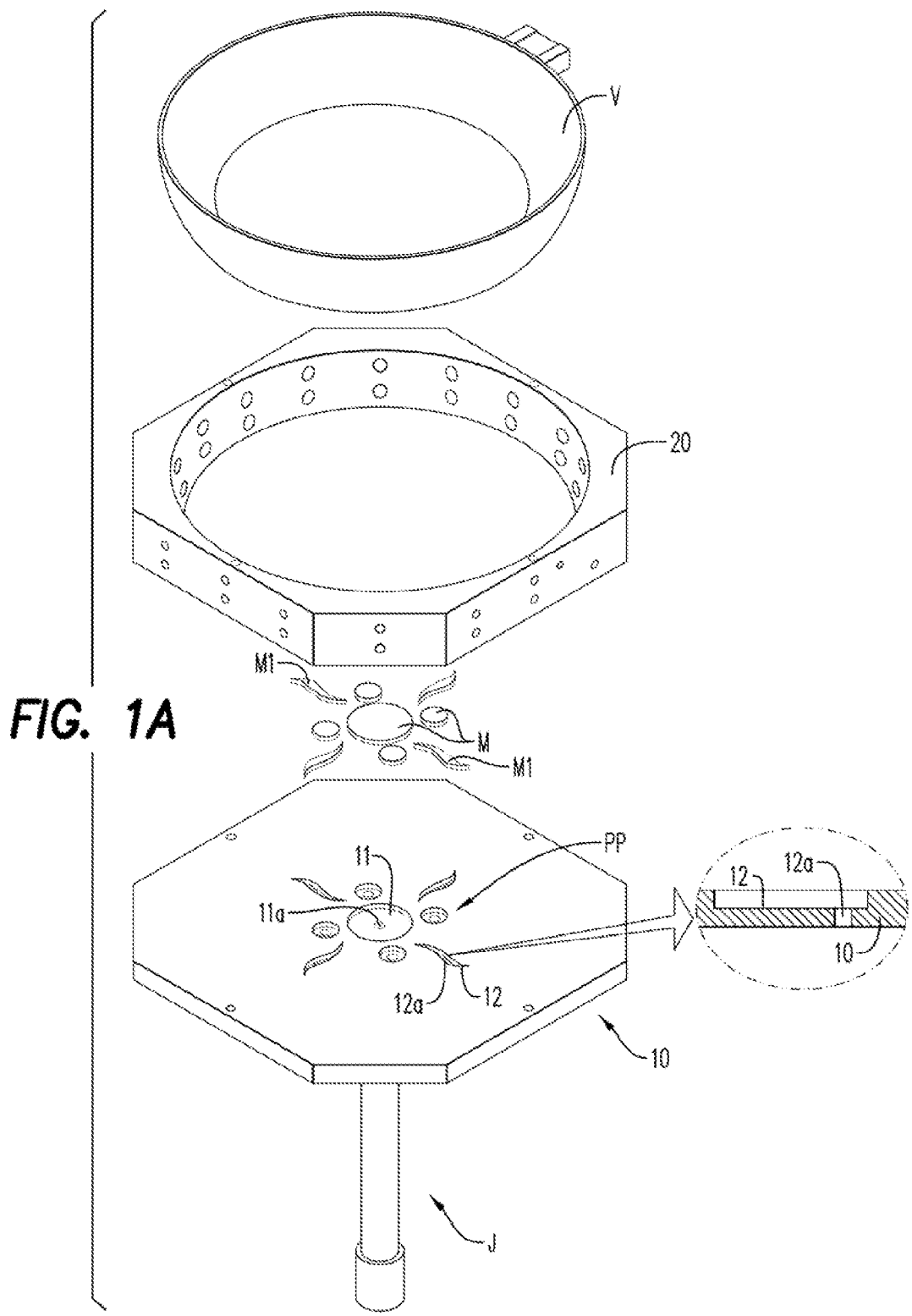
FIG. 1A is an exploded perspective view illustrating a vessel and a jig for coating kitchen vessels according to an embodiment of Korean Patent Application Publication No. 10-2011-0042732.
Figure 1B:
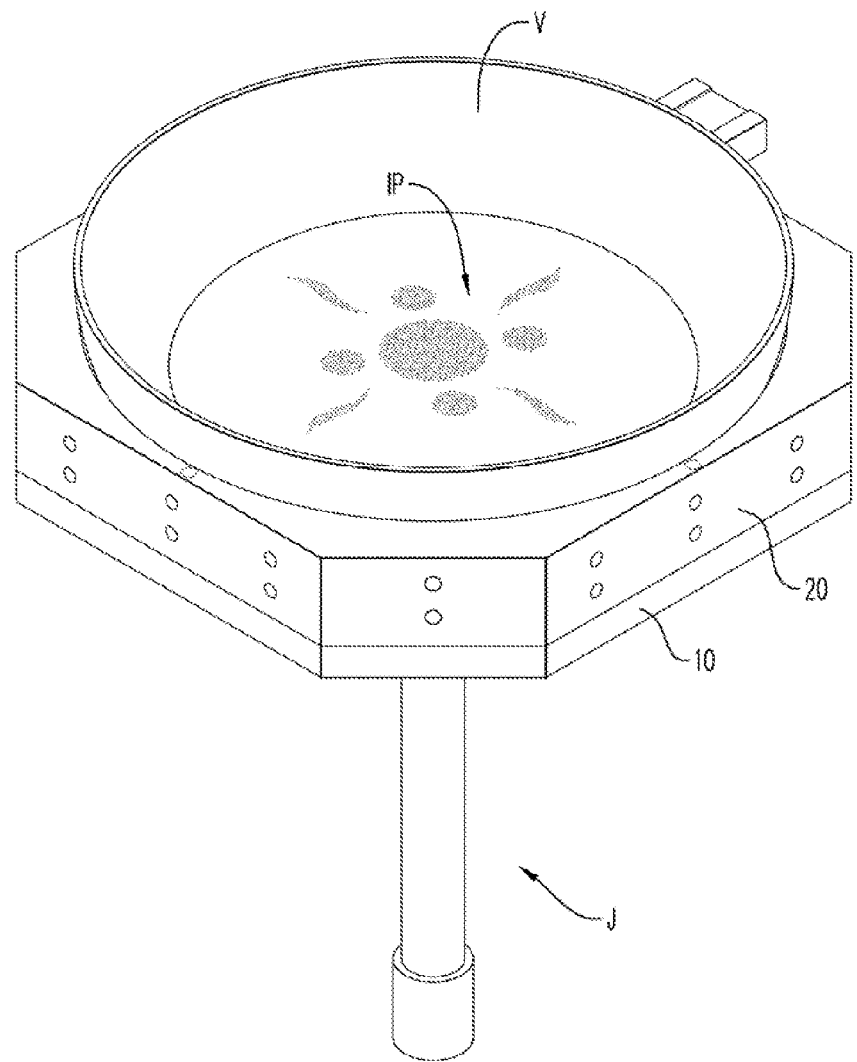
FIG. 1B is a perspective view illustrating the vessel and the jig for coating kitchen vessels according to the illustrated embodiment of Korean Patent Application Publication No. 10-2011-0042732.
Figure 2A:
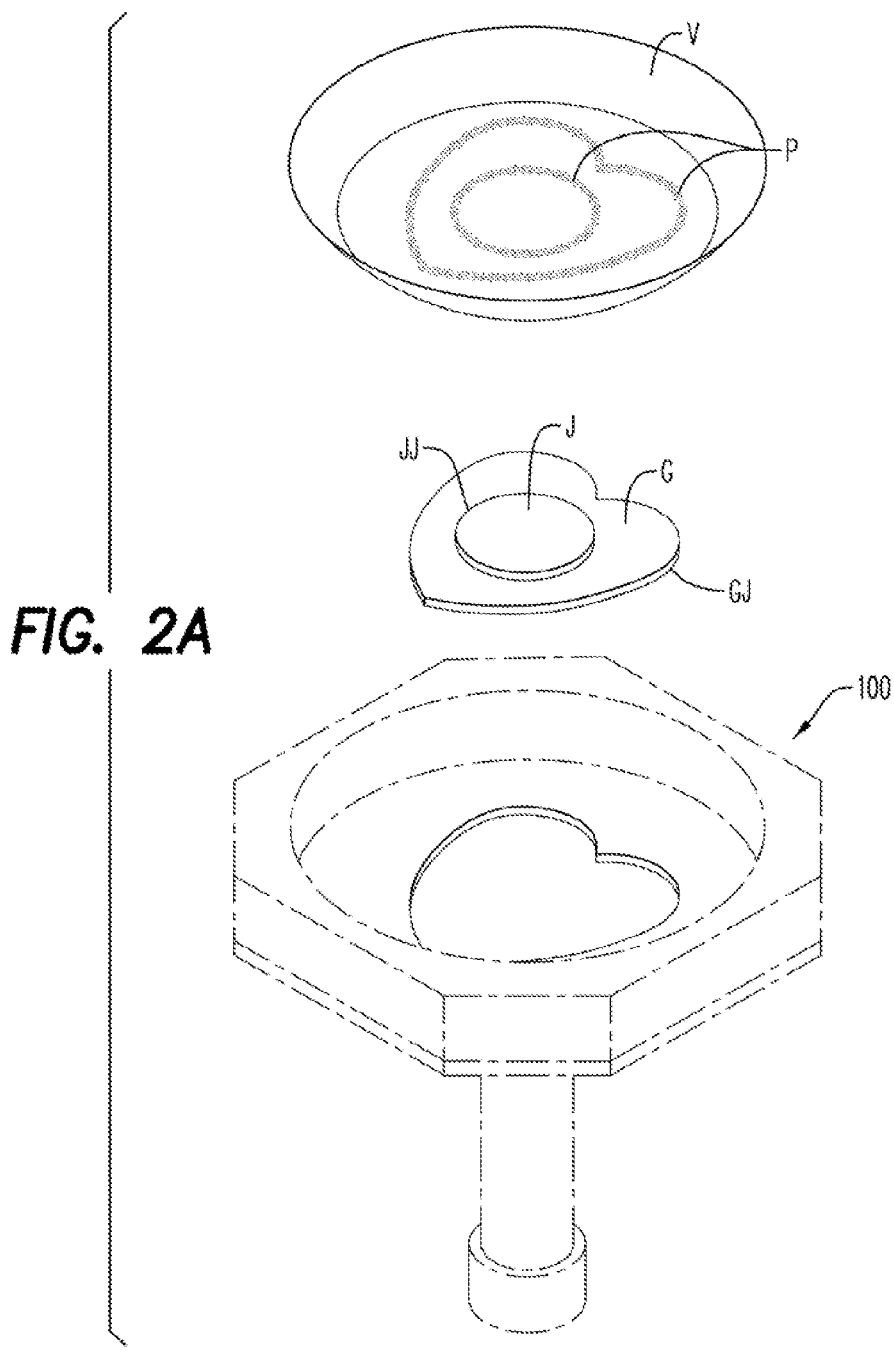
FIG. 2A is a partially exploded, top perspective view illustrating an embodiment of an apparatus for coating kitchen vessels according to a first aspect of the present invention.
Figure 2B:
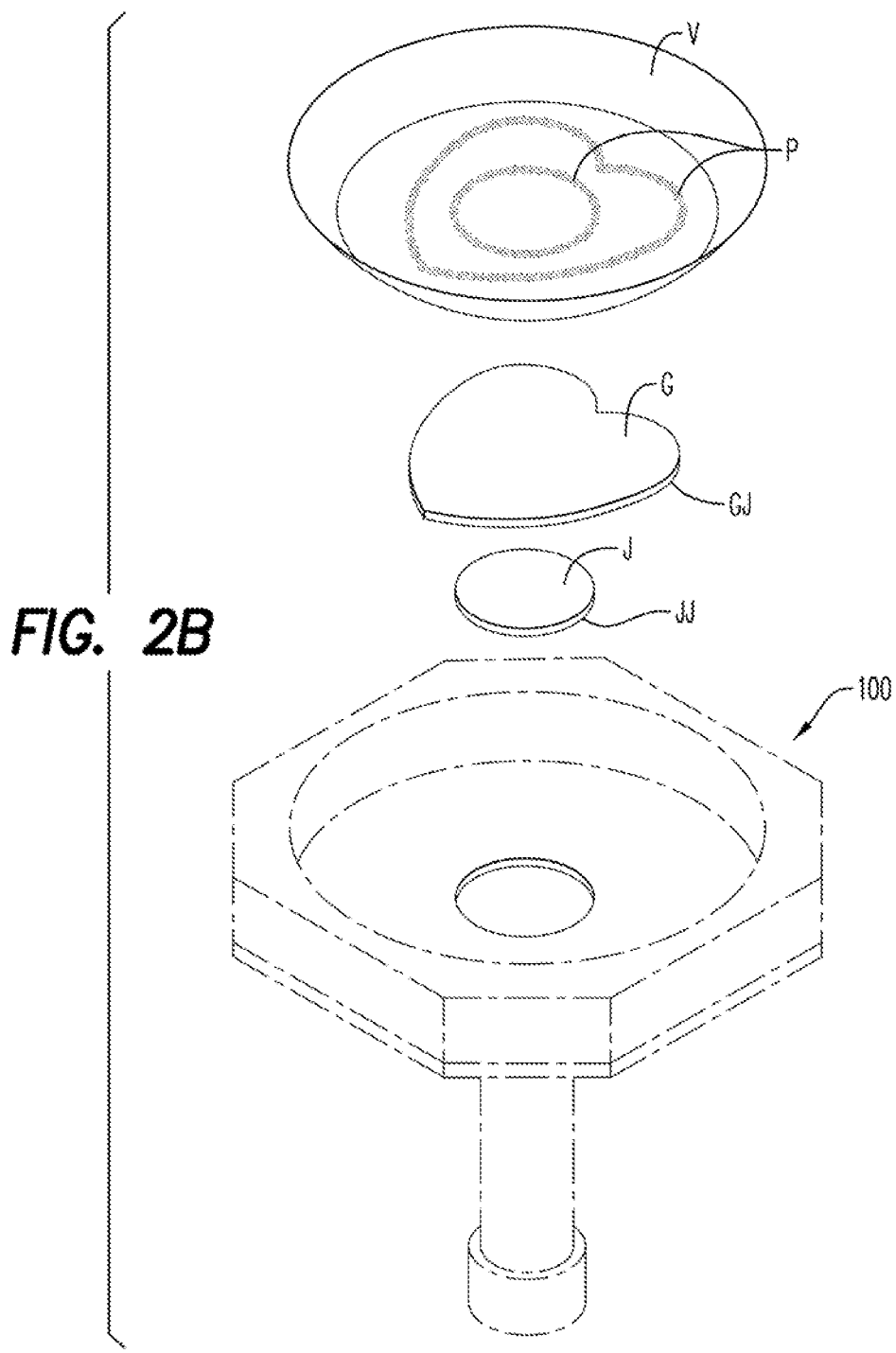
FIG. 2B is an exploded, top perspective view of another embodiment of the apparatus for coating kitchen vessels according to the first aspect of the present invention.
Figure 2C:
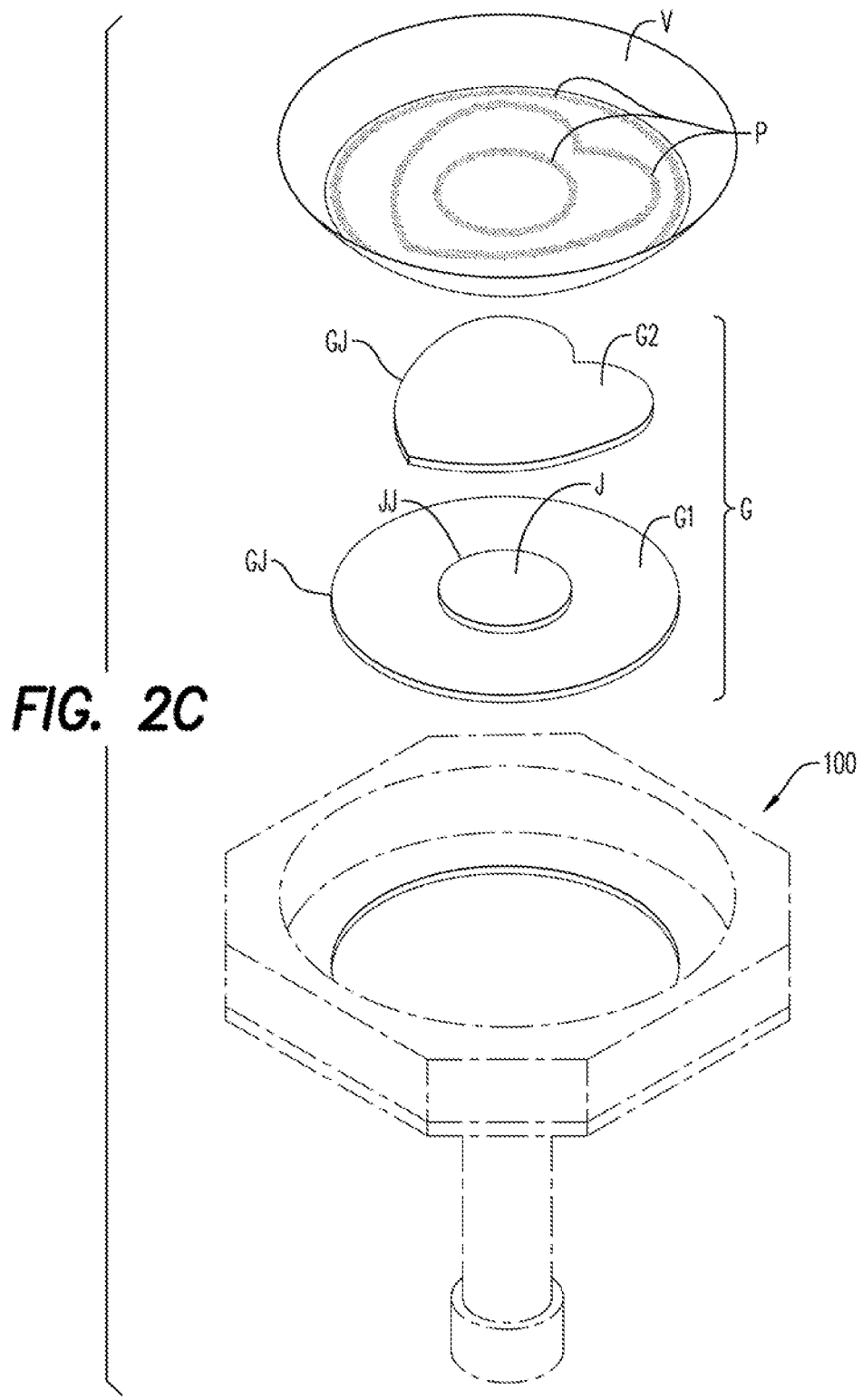
FIG. 2C is a partially exploded, top perspective view of another embodiment of the apparatus for coating kitchen vessels according to the first aspect of the present invention.
Figure 2D:
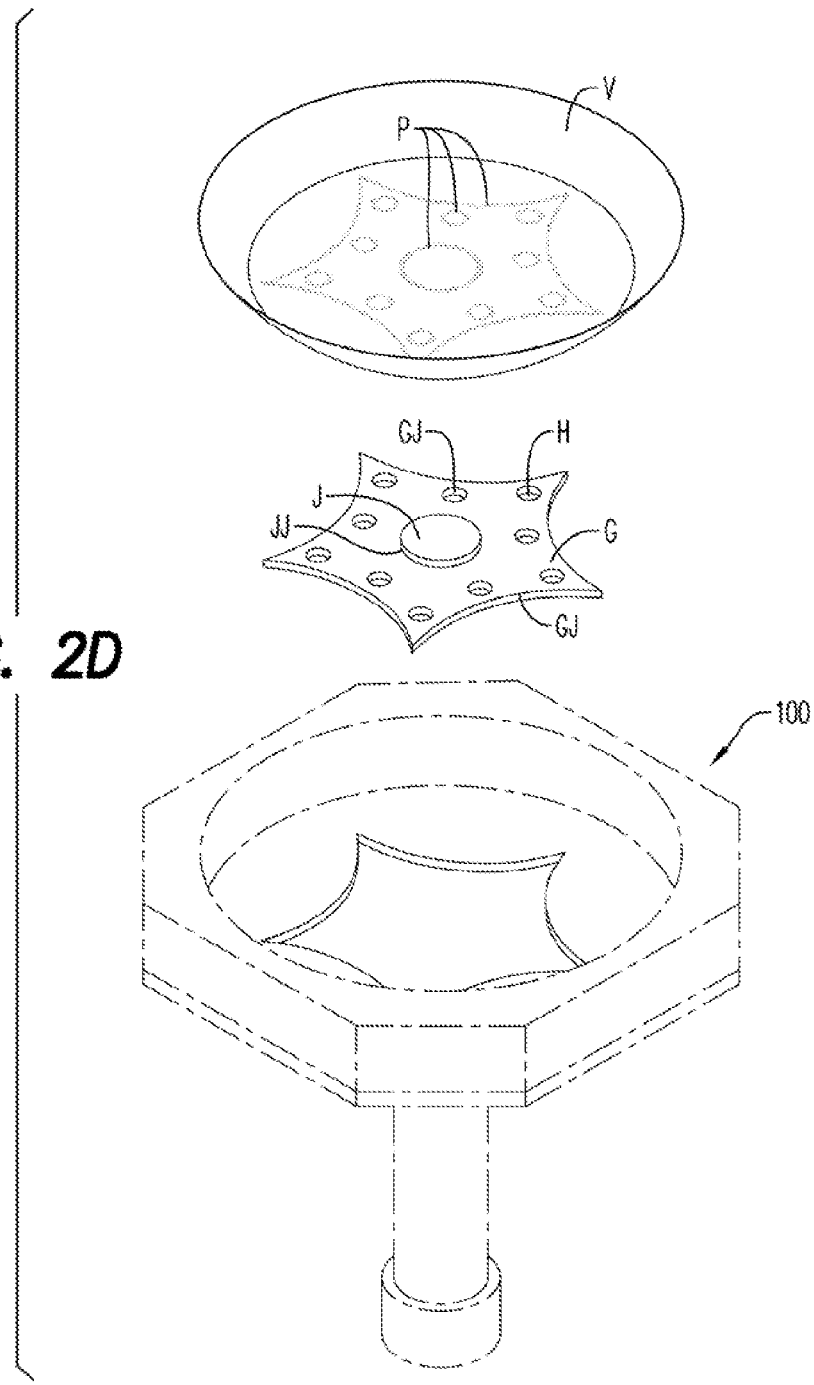
FIG. 2D is a partially exploded, top perspective view of another embodiment of the apparatus for coating kitchen vessels according to the fust aspect of the present invention.
Figure 2F:
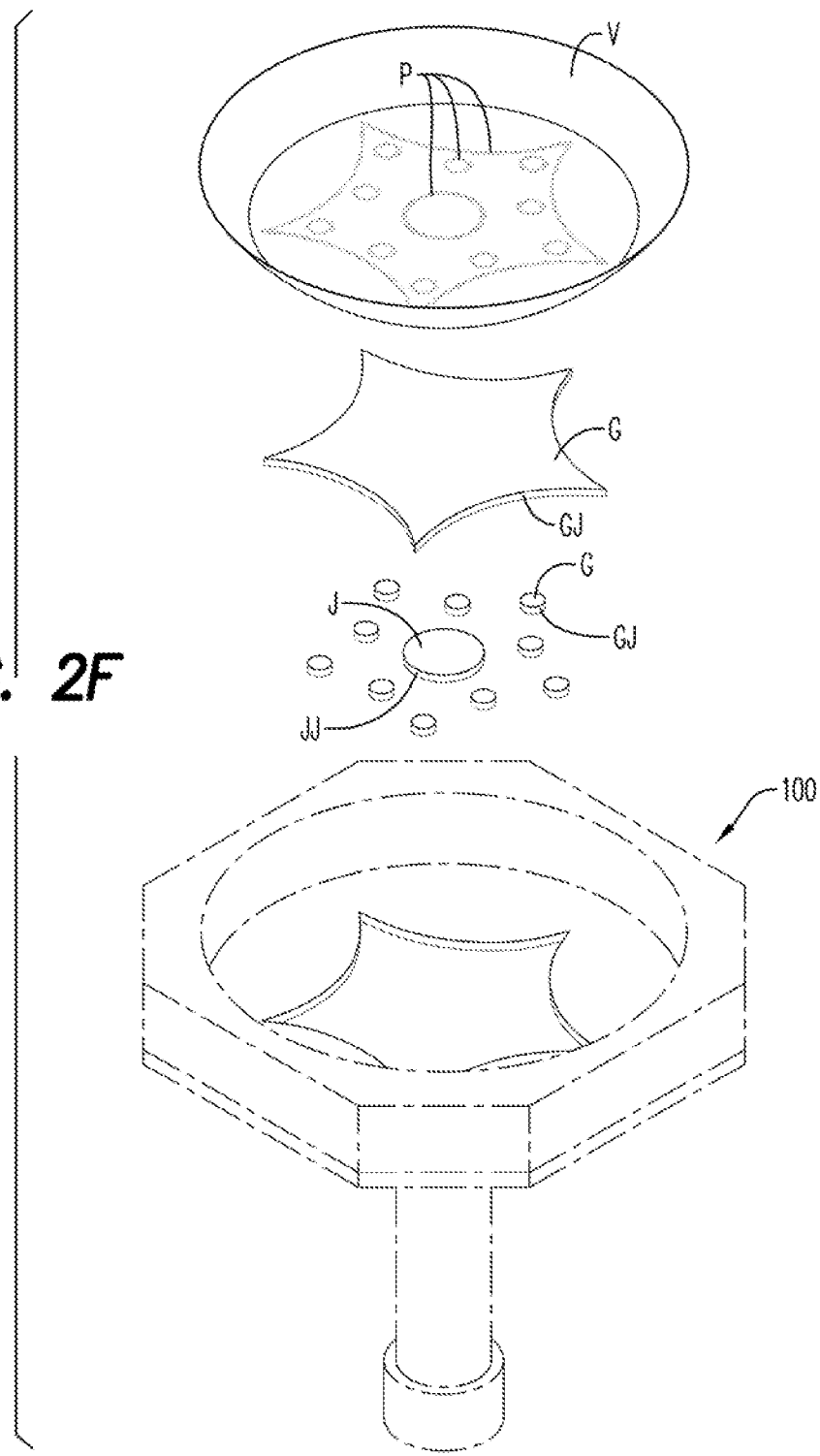
FIG. 2F is an exploded, top perspective view of another embodiment of the apparatus for coating kitchen vessels according to the first aspect of the present invention.
Figure 3A:
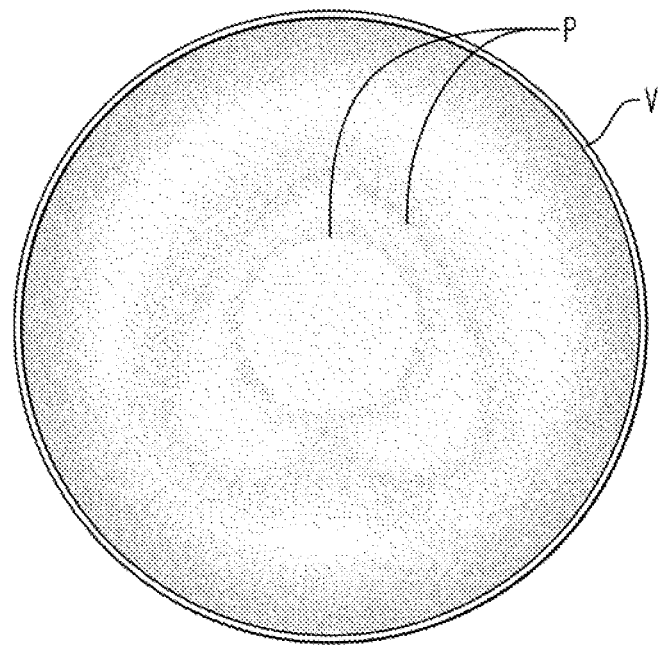
FIGS. 3A and 3B are photographs of samples produced by the apparatus for coating kitchen vessels according to the first aspect of the present invention.
Figure 3B:
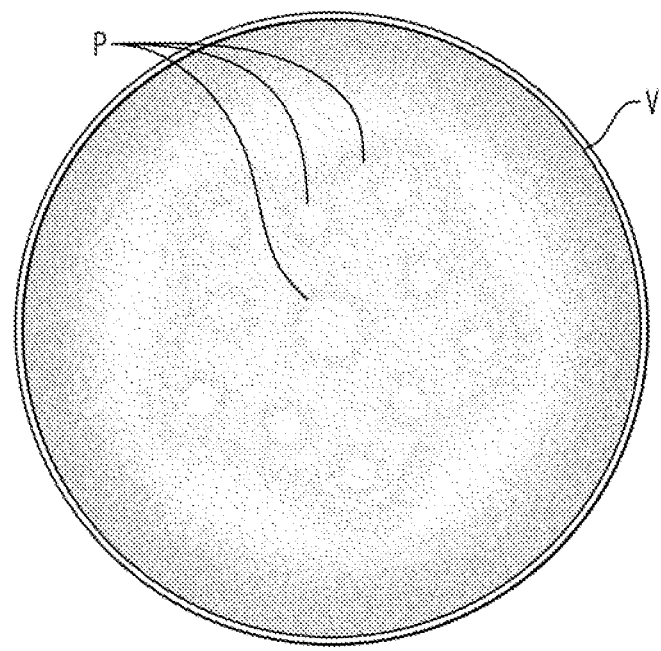

FIGS. 2A to 2F are views illustrating a structure of an apparatus for coating kitchen vessels according to a first embodiment of the present invention, and FIGS. 3A and 3B are pictures of samples produced by the apparatus for coating kitchen vessels according to the first embodiment of the present invention.

As shown in FIGS. 2A to 2F, the apparatus for coating kitchen vessels according to the first embodiment of the present invention includes a jig 100 facing a vessel V to which a coating substance containing magnetic particles is applied. The jig 100 may be disposed under or on the vessel V.

According to the first embodiment, the apparatus includes a magnet J set on the jig 100 to face the vessel V and adapted to apply magnetic force to the coating substance to cause the magnetic particles to be concentrated at a magnetic pole JJ of the magnet J formed at an end portion of the magnet J, and a metal plate G overlapping with the magnet J to be magnetized and thereby apply magnetic force to the coating substance to cause the magnetic particles to be concentrated at a magnetic pole GJ of the metal plate G formed at an end portion of the metal plate G.

Every magnet J generally has two magnetic poles (a North pole and a South pole) having opposite polarities. When a magnet J having a North pole and a South pole is divided into two pieces, each piece of the magnet J also has a North pole and a South pole. Regardless of how many times division of the magnet J is repeated, each piece of the magnet J has a North pole and a South pole. That is, the North pole and the South pole are always formed in pairs.

The magnetic force refers to a force acting between two magnetic poles. The force acting between magnetic poles having the same polarity is a repulsive force by which the poles repel each other, while the force acting between the magnetic poles having different polarities is an attractive force by which the magnetic poles attract each other.

Here, the magnetic pole refers to a portion of a body where the magnitude of the magnetic force is greatest. For example, in the case of a bar magnet, the magnetic poles are regions of the magnet about 1.5 cm inside from both ends of the magnet. The magnetic pole refers to a region rather than a point. In the present application, the magnetic poles will be referred to as a magnetic pole JJ of the magnet J and a magnetic pole GJ of the metal plate G for convenience of description. The magnetic pole JJ of the magnet J is formed at an end of the magnet J, i.e., in the region, of an end portion of the magnet J. Since the magnet J is generally formed in the shape of a disc or a rectangle, an edge thereof may be viewed as the magnetic pole JJ of the magnet J. The magnetic pole GJ of the metal plate G is formed at a metal plate when the metal plate G is magnetized by the magnetic force of the magnet J. Since the metal plate G is generally formed in various shapes, the edge thereof may be viewed as the magnetic pole GJ of the metal plate G. A pattern hole H and a through hole T, which will be described later, also have magnetic poles GJ of the metal pi ate G at the edges thereof.

Since a magnet J is shaped by preparing a mold and introducing a material of the magnet J into the mold, forming the magnet J in various shapes is not easy and is costly.

On the other hand, the metal plate G which is magnetized by the magnetic force of the magnet J can be easily cut, punched and bent to have various shapes.

To best utilize the characteristics as above in the present invention, the magnetic force of the magnet J is used along with the metal plate G which is magnetized by the magnetic force. To overcome high degradation in clarity of a stereoscopic pattern P and limit in realization of various stereoscopic patterns P due to insufficient magnetizing force of the metal plate G resulting from simple arrangement of the metal plate G around the magnet J as in Korean Patent Application Publication No. 10-2011-0042732, the magnet J is disposed on the jig 100, overlapping with the metal plate G to allow the metal plate G to actively receive magnetic force from the magnet J to be magnetized. This is intended to produce clear stereoscopic patterns P on a vessel V in an overlapping manner by maximizing magnetic force according to the magnetizing force of the metal plate G such that the magnetic force according to the magnetizing force become as strong as the magnetic force of the magnet J.

Preferably, according to the first embodiment, the magnet J may be disposed on the metal plate G to face the vessel V as shown in FIG. 2A, or the metal plate G may be disposed on the magnet J to face the vessel V as shown in FIG. 2B. Alternatively, the metal plate G may include a first metal plate G1 and a second metal plate G2 overlapping each other with the magnet J placed therebetween as shown in FIG. 2C, or may include pattern holes H to form other magnetic poles GJ of the metal plate G to additionally concentrate the magnetic particles by applying magnetic force to the coating substance when the metal plate G is magnetized by the magnet J, as shown in FIG. 2D. Alternatively, other magnets J may be disposed on or under the metal plate G to overlap with the metal plate G as shown in FIG. 2E, or other metal plates G may be disposed on or under the metal plate G to overlap with the metal plate G as shown in FIG. 2F.

More specifically, according to the first embodiment, in the case that the magnet J is disposed on the metal plate G to face the vessel V as shown in FIG. 2A, the clarity of a stereoscopic pattern P by the magnetic pole JJ of the magnet J having strong magnetic force may be further maximized, while the clarity of a stereoscopic pattern P by the magnetic pole GJ of the metal plate G producing weak magnetic force may be lowered. Thereby, stereoscopic patterns P with different degrees of clarity are preferably produced on the vessel V in an overlapping manner. In the case that the metal plate G is disposed on the magnet J to face the vessel V as shown in FIG. 2B, the magnetic pole GJ of the metal plate G is also caused to have a strong magnetic force as strong as the magnetic force of the magnetic pole JJ of the magnet J which produces a clear stereoscopic pattern P. Thereby, clearer stereoscopic patterns P may be preferably produced on the vessel V in an overlapping manner. A sample produced by the configurations shown in FIGS. 2A and 2B can be seen in FIG. 3A. In the case that the metal plate G includes a first metal plate G1 and a second metal plate G2 overlapping each other with the magnet J placed therebetween as shown in FIG. 2C, the magnetic pole JJ of the magnet J having strong magnetic force produced by the magnet J overlaps with the magnetic poles GJ of the metal plate G of the first metal plate G1 and the second metal plate G2 having different weak magnetic forces, and thereby stereoscopic patterns P with various degrees of clarity may preferably be produced on the vessel V in an overlapping manner. In the case that the metal plate G includes pattern holes H to form other magnetic poles GJ of the metal plate G to additionally concentrate-the magnetic particles by applying magnetic force to the coating substance when the metal plate G is magnetized by the magnet J, as shown in FIG. 2D, magnetic poles GJ of the metal plate G are formed not only at the end portion, i.e., the edge of the metal plate G but also at the end portions of the pattern holes H, and thereby various stereoscopic patterns P can be produced on the vessel V in an overlapping manner according to the number and shape of the pattern holes H. Further, in the case that other magnets J are disposed on or under the metal plate G to overlap with the metal plate G as shown in FIG. 2E, various clearer stereoscopic patterns P can be preferably produced on the vessel V in an overlapping manner according to the number of the other magnets J. A sample produced by the configurations shown in FIGS. 2C to 2E can be seen in FIG. 3B. In the case that other metal plates G are disposed on or under the metal plate G to overlap with the metal plate G as shown in FIG. 2F, the magnetic pole JJ of the magnet J having strong magnetic force produced by the magnet J overlaps with the magnetic poles GJ of the metal plate G having different weak magnetic forces produced by the other metal plates G, and thereby various clear stereoscopic patterns P can be preferably produced on the vessel V in an overlapping manner.

Figure 4A:
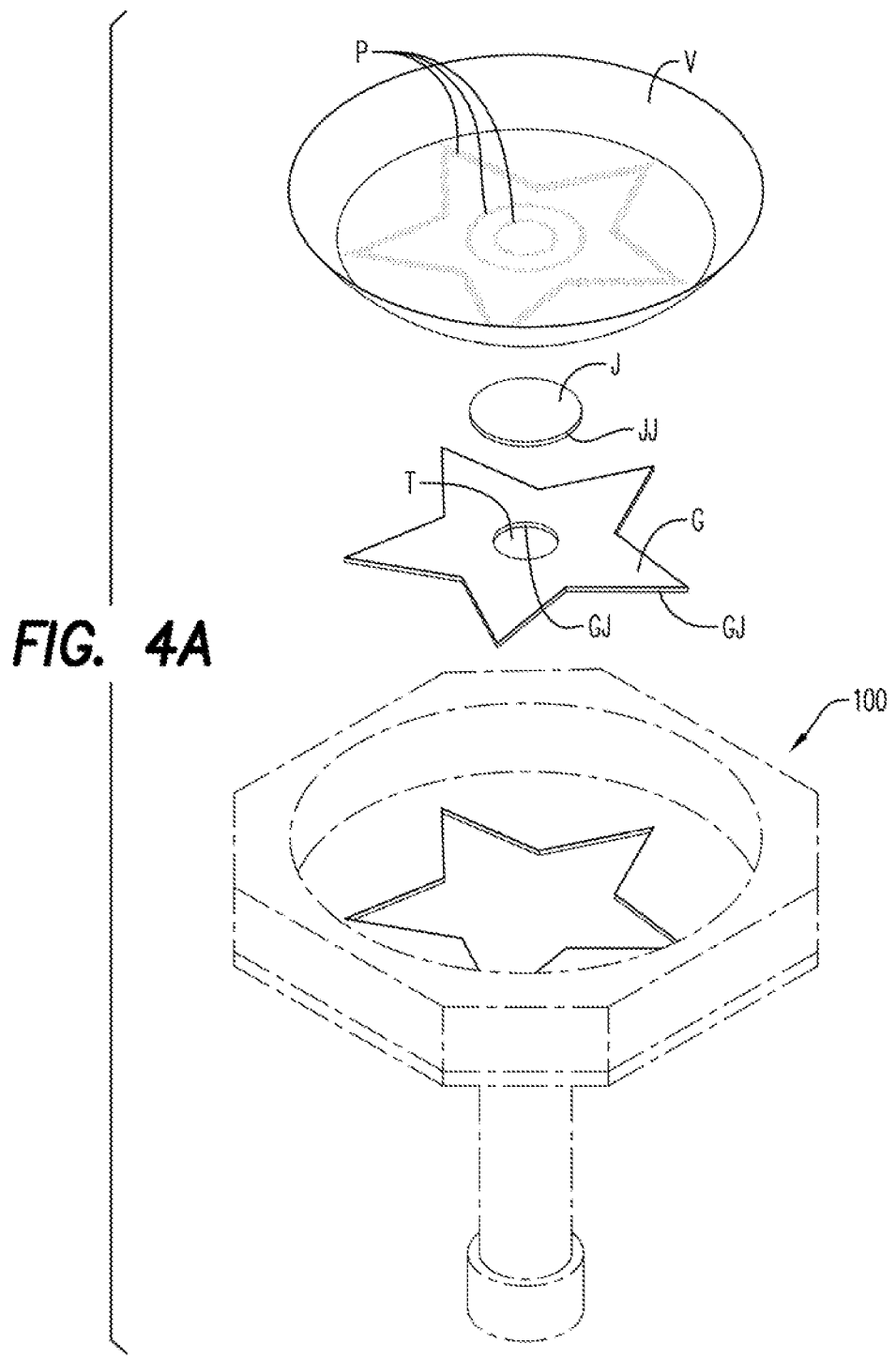
FIG. 4A is an exploded, top perspective view of a structure of an embodiment of an apparatus for coating kitchen vessels according to a second aspect of the present invention.
Figure 4B:
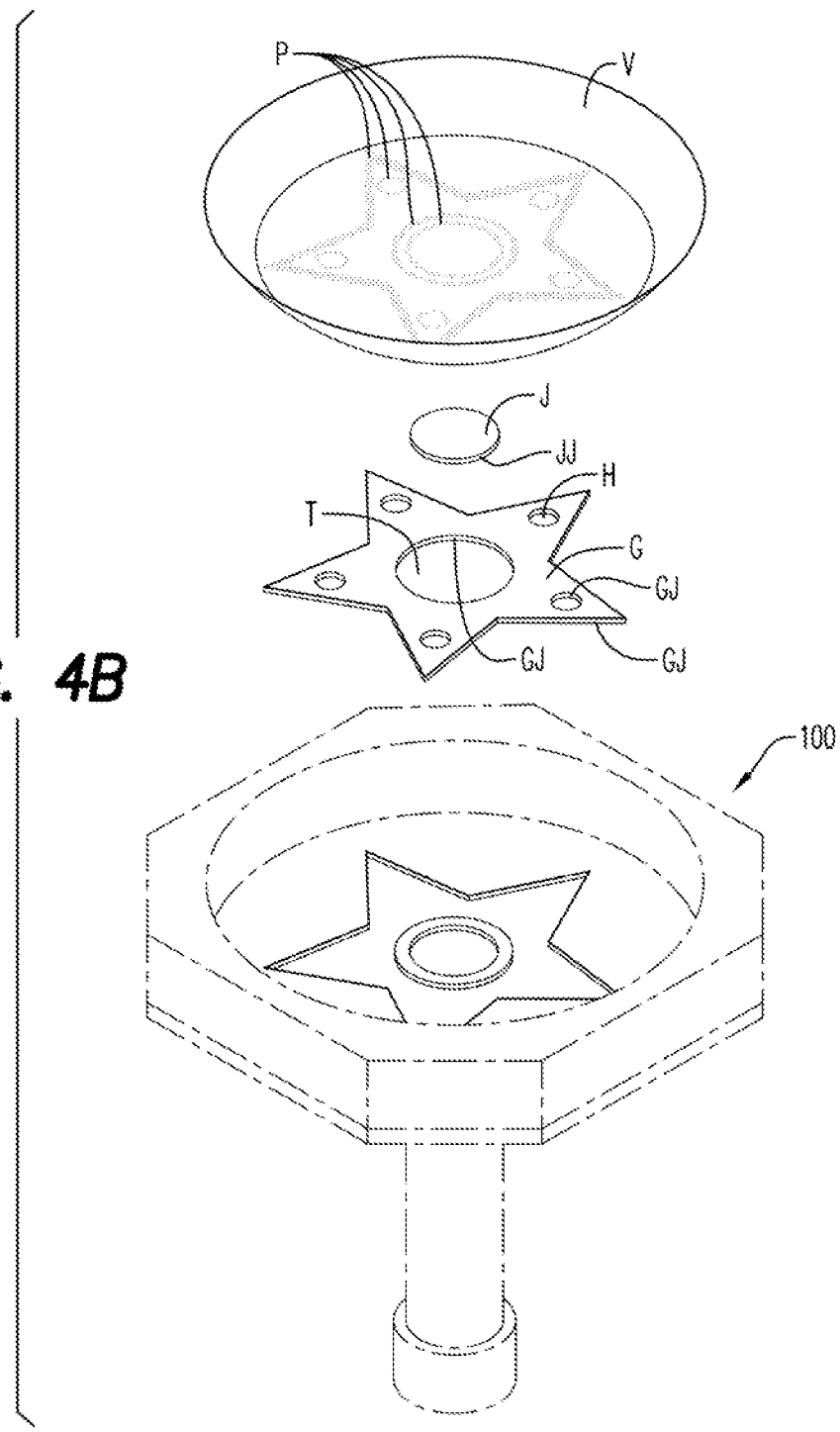
FIG. 4B is an exploded, top perspective view of another embodiment of the apparatus for coating kitchen vessels according to the second aspect of the present invention.
Figure 4C:
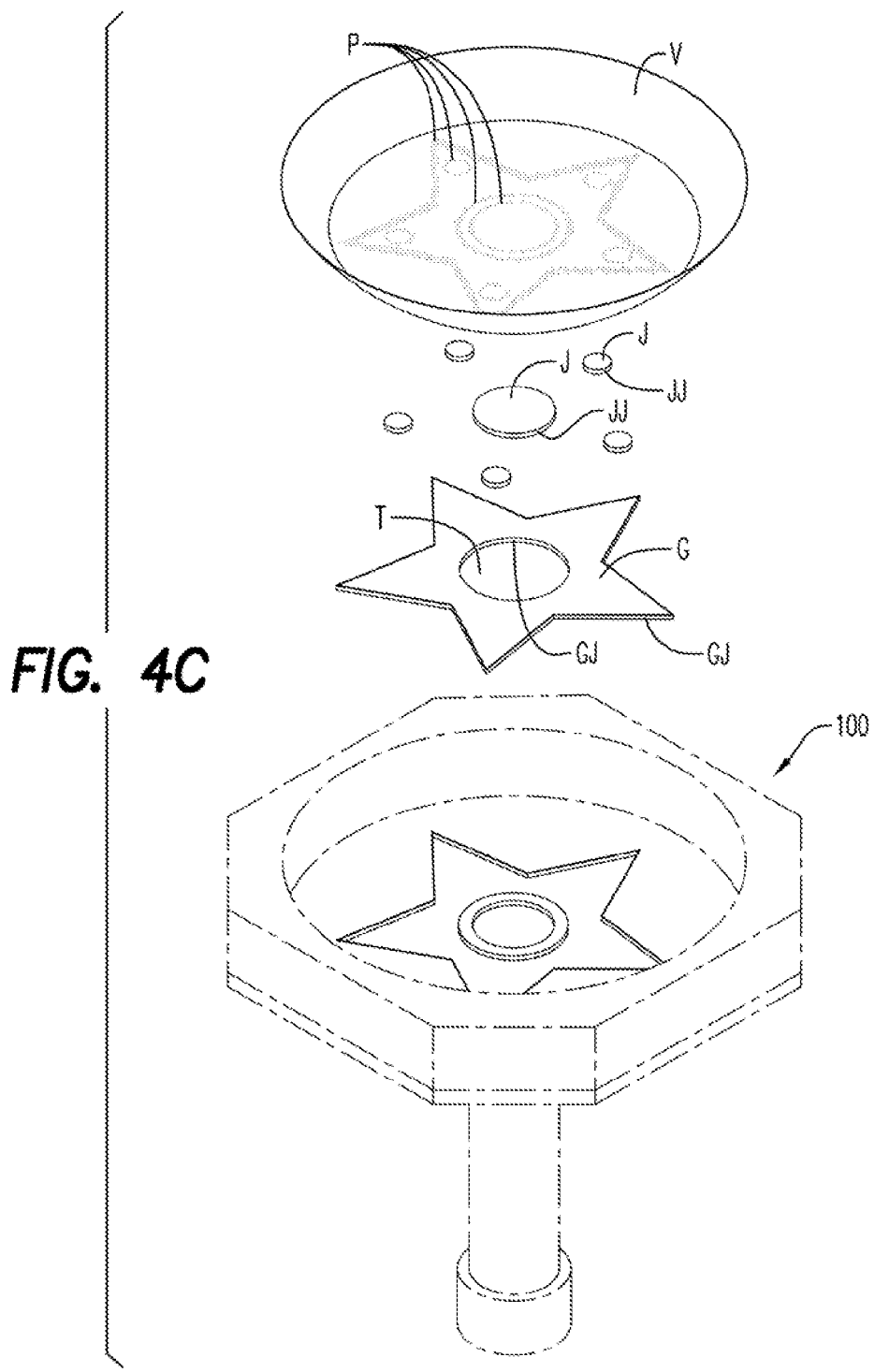
FIG. 4C is an exploded, top perspective view of another embodiment of the apparatus for coating kitchen vessels according to the second aspect of the present invention.
Figure 4D:
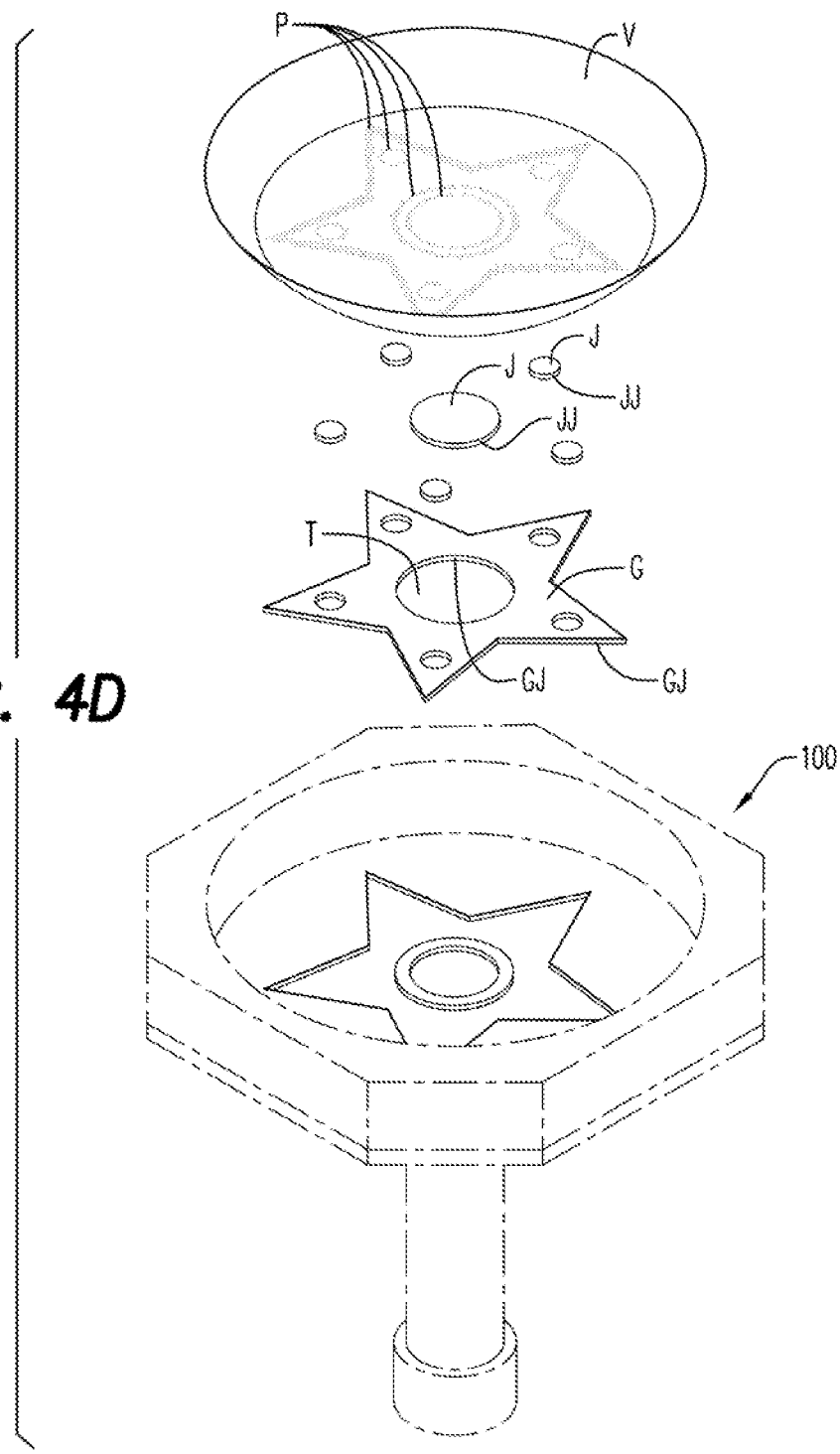
FIG. 4D is an exploded, top perspective view of another embodiment of the apparatus for coating kitchen vessels according to the second aspect of the present invention.
Figure 5A:
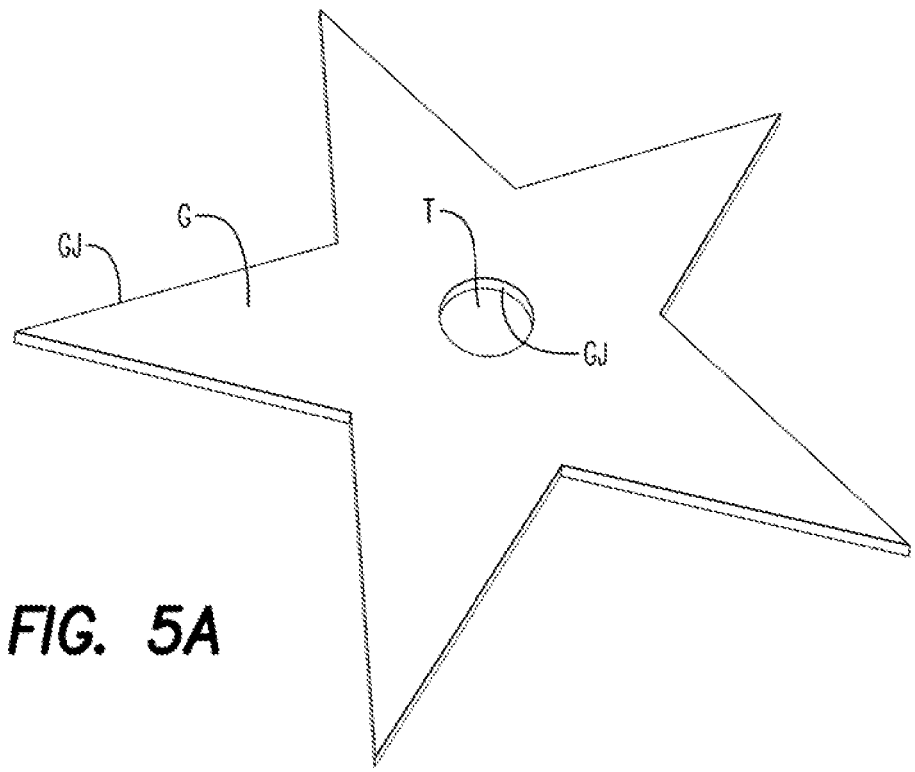
FIGS. 5A, 5B, and 5C are photographs of a magnet and a metal plate applied to the apparatus for coating kitchen vessels according to the second aspect of the present invention.
Figure 5B:
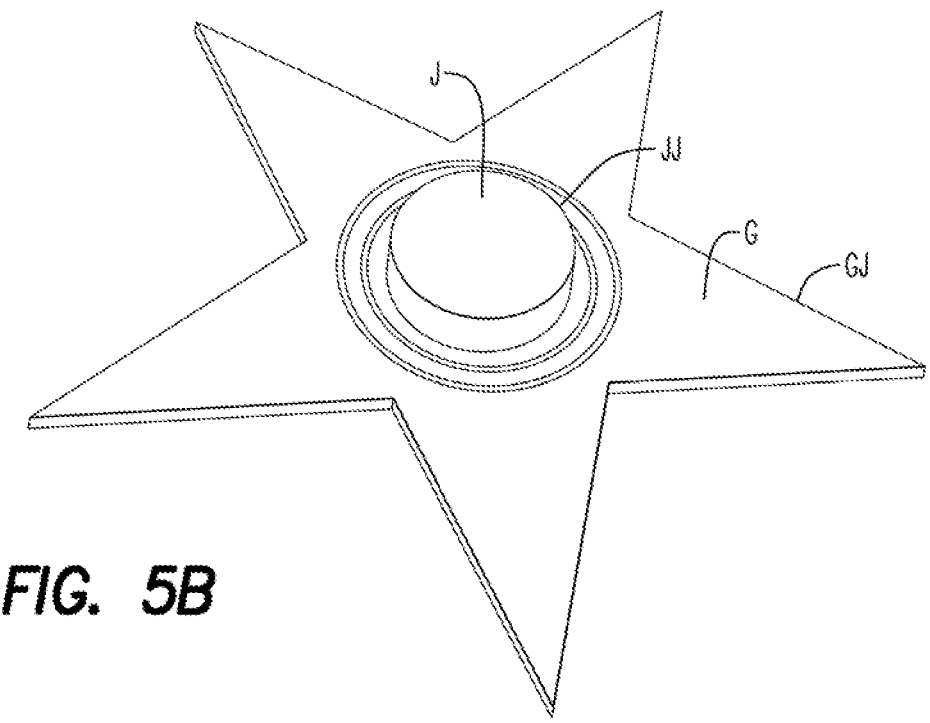

FIGS. 4A to 4D are views illustrating a structure of an apparatus for coating kitchen vessels according to a second embodiment of the present invention, and FIGS. 5A and 5B are pictures of a magnet J and a metal plate G applied to the apparatus for coating kitchen vessels according to the second embodiment of the present invention.

The apparatus for coating kitchen vessels according to the second embodiment includes a jig 100 facing a vessel V to which a coating substance containing magnetic particles is applied as shown in FIGS. 4A to 4D. The jig 100 may be disposed under or on the vessel V.

According to the second embodiment, the apparatus includes a magnet J set on the jig 100 to face the vessel V and adapted to apply magnetic force to the coating substance to cause the magnetic particles to be concentrated at a magnetic pole JJ of the magnet J formed at an end portion of the magnet J, and a metal plate G provided with a through hole facing the magnet J to be magnetized and thereby apply magnetic force to the coating substance to cause the magnetic particles to be concentrated at magnetic poles GJ of the metal plate G formed at end portions of the metal plate G.

Considering difficulty in manufacturing the magnet J and to best utilize easy work of cutting, punching and bending of the metal plate G, the second embodiment uses magnetic force of the magnet J along with the metal plate G which is magnetized by the magnetic force. To overcome high degradation of clarity of a stereoscopic pattern P and limit in realization of various stereoscopic patterns P due to insufficient magnetizing force of the metal plate G resulting from simple arrangement of the metal plate G around the magnet J as in Korean Patent Application Publication No. 10-2011-0042732, the second embodiment includes a metal plate G provided with a through hole T (the magnet J may be fitted into the through hole T, may be placed in the through hole T formed to be larger than the magnet J, or may be positioned under or on the through hole T formed to be smaller than the magnet J) and adapted to be magnetized and apply magnetic force to the coating substance to cause the magnetic particles to be concentrated at the magnetic pole GJ of the metal plate G formed at the end portion of the metal plate G. Thereby, clearer stereoscopic patterns P are allowed to be produced on the vessel V in an overlapping manner as the magnetic force according to the magnetizing force of the metal plate G is maximized to be as strong as the magnetic force of the magnet I.

Figure 5C:
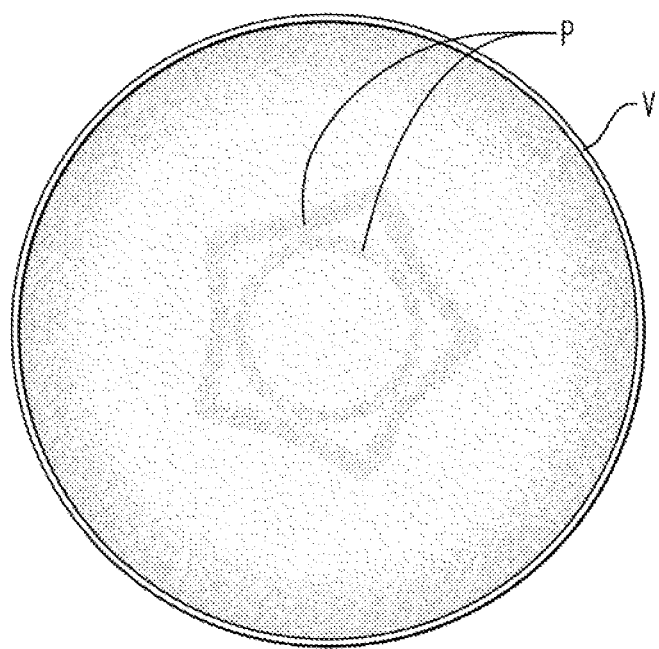

More specifically, according to the second embodiment, the through hole T facing the magnet J may be formed to have a smaller size than the magnet J to position the metal plate G on or under the magnet J as shown in FIGS. 5A and 5B. Alternatively, the through hole T may be formed to have a larger size than the magnet J to allow the magnet J to be fitted thereinto, and thereby stereoscopic patterns P according to the magnetic pole JJ of the magnet J formed at the end portion of the magnet J and the magnetic poles GJ of the metal plate G formed at the edge of the metal plate G and the end portion of the through hole T can be produced on the vessel V in an overlapping manner, as shown in FIG. 5C.

Meanwhile, according to the second embodiment, the metal plate G may include pattern holes H to form other magnetic poles GJ of the metal plate G to additionally concentrate the magnetic particles by applying magnetic force to the coating substance when the metal plate G is magnetized by the magnet J, as shown in FIG. 4B. Alternatively, other magnets J may be disposed on or under the metal plate G to overlap with the metal plate G as shown in FIG. 4C, or other metal plates G may be disposed on or under the metal plate G to overlap with the metal plate G as shown in FIG. 4D.

More specifically, according to the second embodiment, in the case that the metal plate G includes pattern holes H to form other magnetic poles GJ of the metal plate G to additionally concentrate the magnetic particles by applying magnetic force to the coating substance when the metal plate G is magnetized by the magnet J, as shown in FIG. 4B, magnetic poles GJ of the metal plate G are formed at the pattern holes H, and thereby clear stereoscopic patterns P corresponding to the pattern holes H can be produced on the vessel V in an overlapping manner according to the number and shape of the pattern holes H. In the case that other magnets J are disposed on or under the metal plate G to overlap with the metal plate G as shown in FIG. 4C, clearer stereoscopic patterns P corresponding to the magnetic poles JJ formed at the end portions of the other magnets J can be additionally produced on the vessel V in an overlapping manner. In the case that other metal plates G are disposed on or under the metal plate G to overlap with the metal plate G as shown in FIG. 4D, magnetic poles GJ are additionally formed at the end portions of the other metal plates G, and thereby stereoscopic patterns P corresponding to the magnetic poles GJ of the other metal plates G can be more preferably produced on the vessel V in an overlapping manner.

Figure 6A:
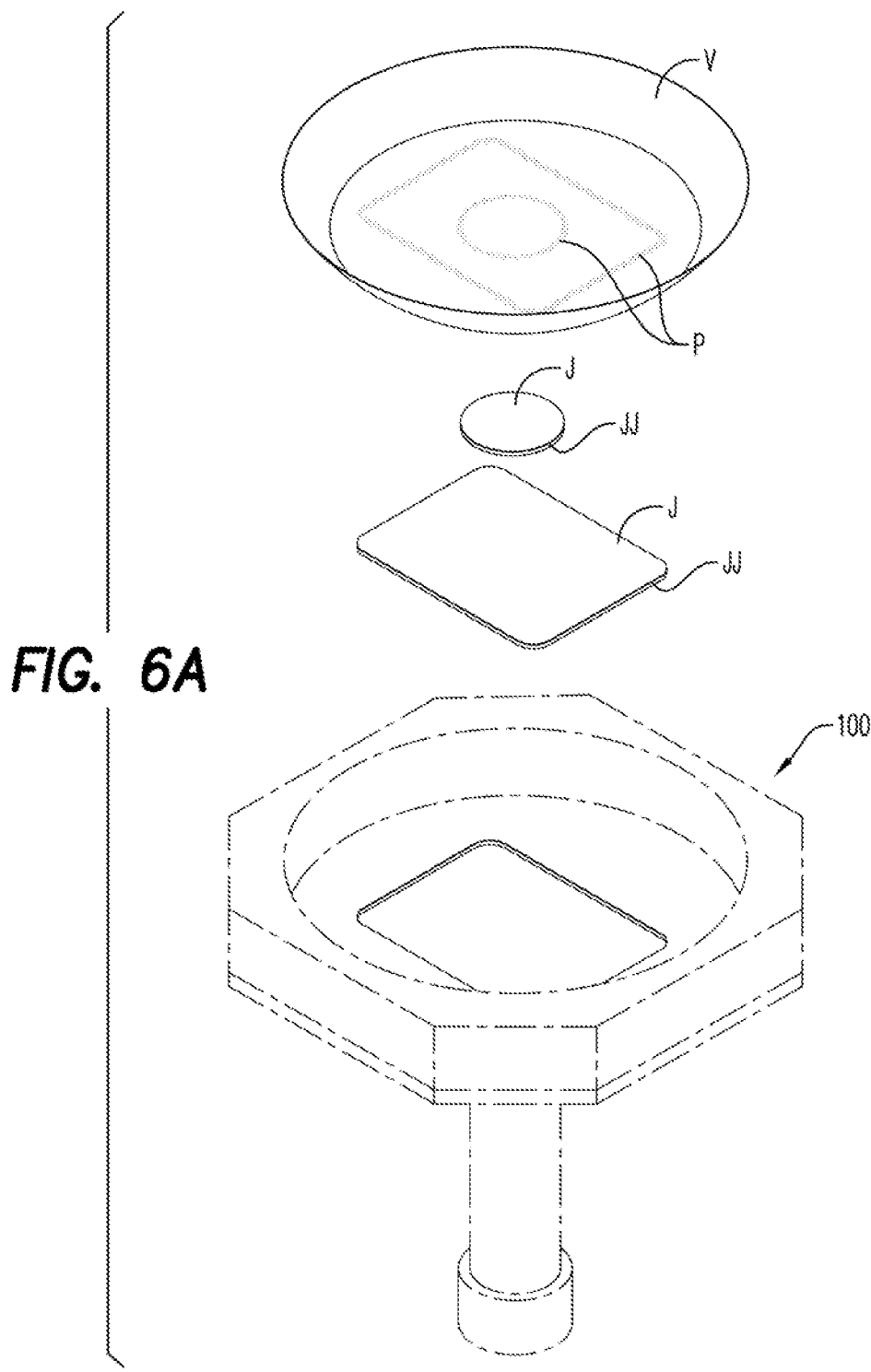
FIG. 6A is an exploded, top perspective view of a structure of an embodiment of an apparatus for coating kitchen vessels according to a third aspect of the present invention.
Figure 6B:
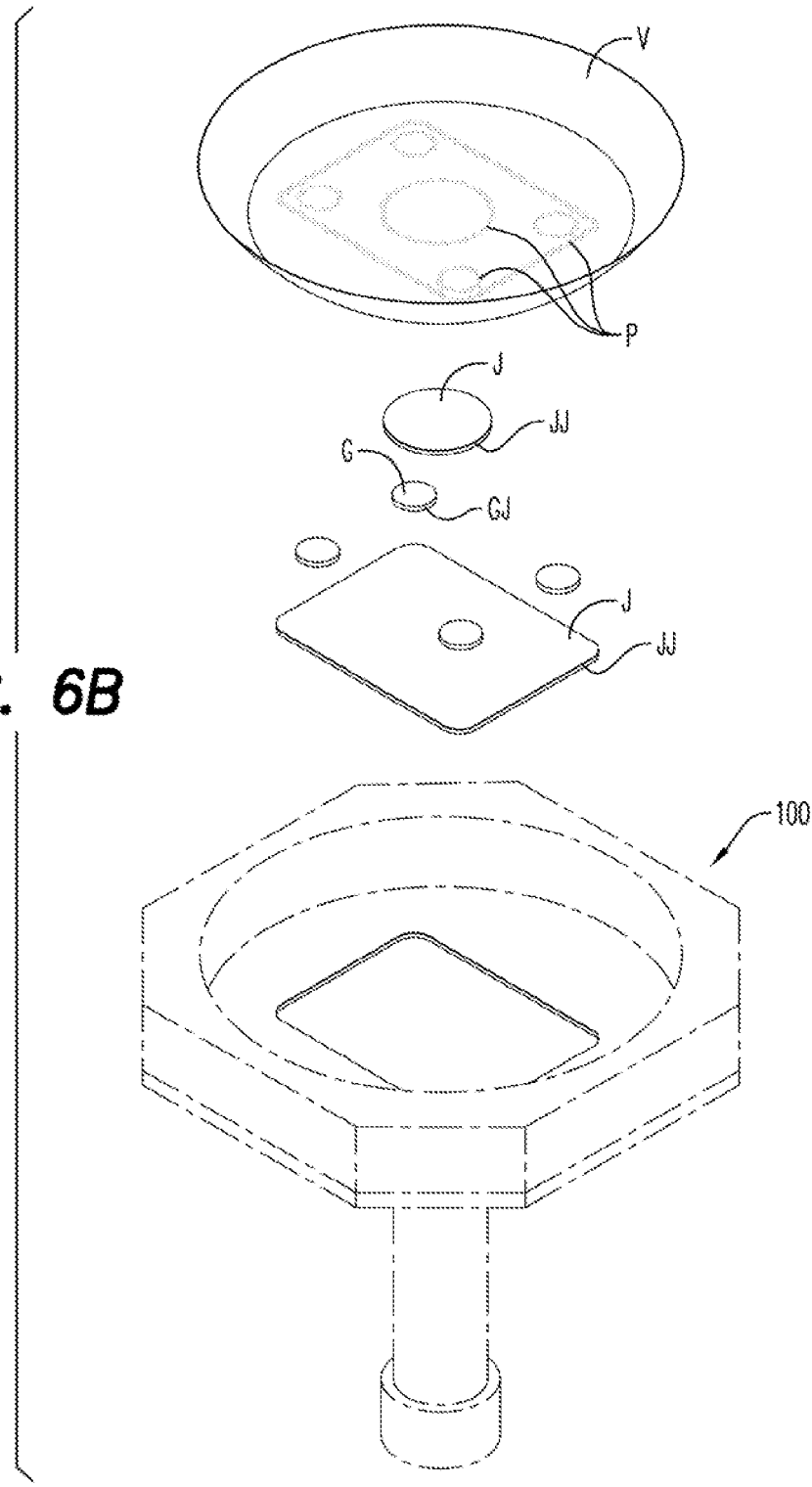
FIG. 6C is an exploded, top perspective view of another embodiment of the apparatus for coating kitchen vessels according to the third aspect of the present invention.
Figure 6C:
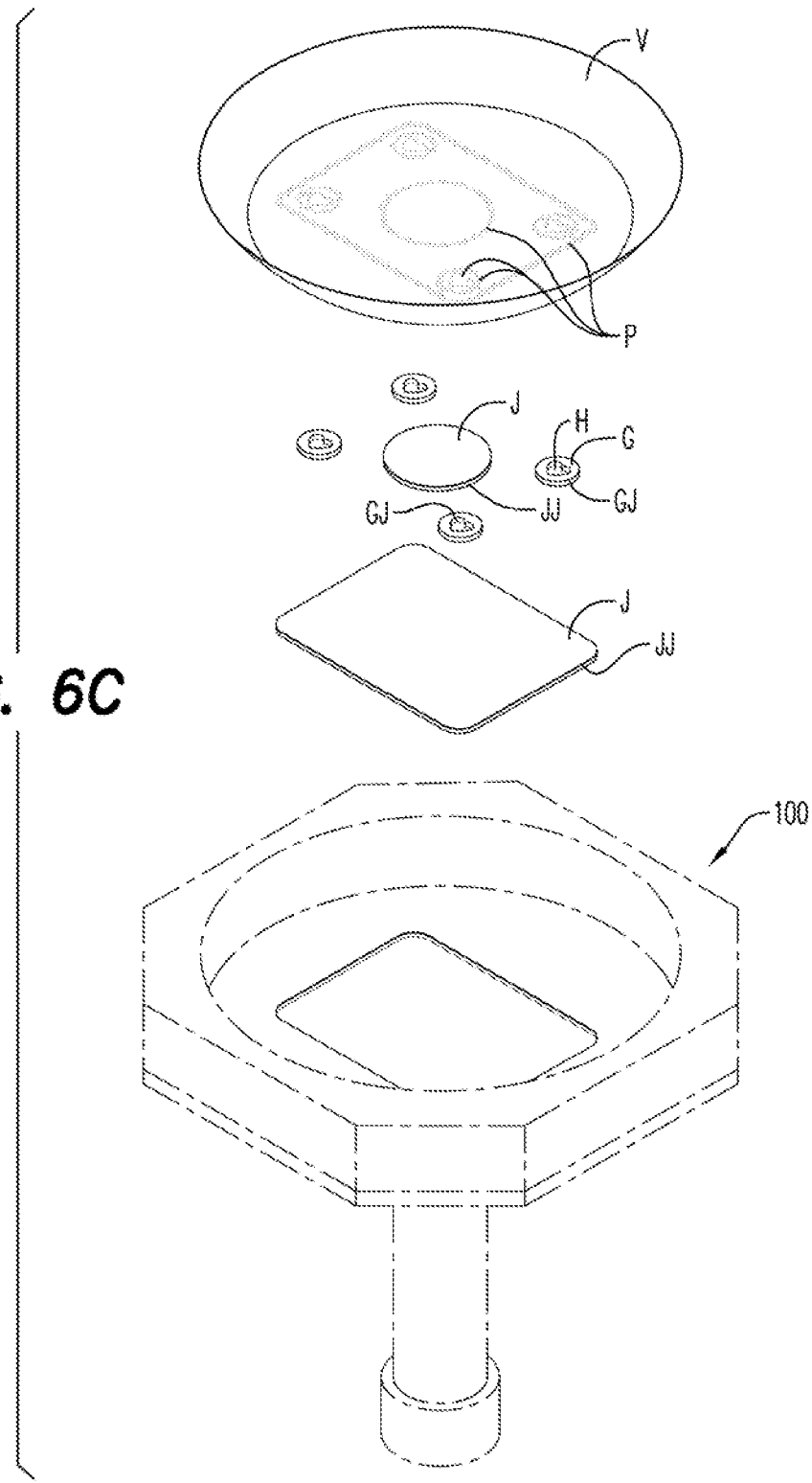
Figure 7:
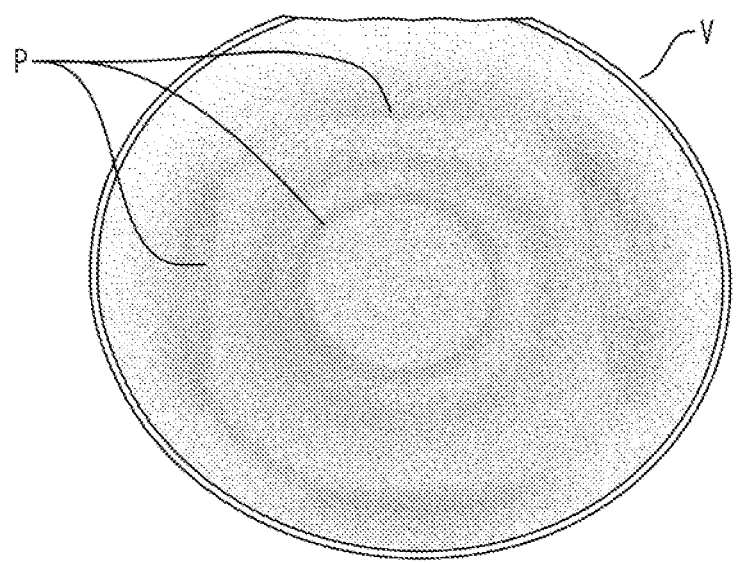
FIG. 7 is a photograph of a sample produced by the apparatus for coating kitchen vessels according to the third aspect of the present invention.

FIGS. 6A to 6C are views illustrating a structure of an apparatus for coating kitchen vessels according to a third embodiment of the present invention, and FIG. 7 is a picture of a sample produced by the apparatus for coating kitchen vessels according to the third embodiment of the present invention.

As shown in FIGS. 6A to 6C the apparatus for coating kitchen vessels according to the third embodiment of the present invention includes a jig 100 facing a vessel V to which a coating substance containing magnetic particles is applied. The jig 100 may be disposed under or on the vessel V.

According to the third embodiment, the apparatus includes a magnet J set on the jig 100 to face the vessel V and adapted to apply magnetic force to the coating substance to cause the magnetic particles to be concentrated at a magnetic pole JJ of the magnet J formed at an end portion of the magnet J, and another magnet J disposed on or under the magnet J to overlap with the magnet J to apply magnetic force to the coating substance and thereby cause magnetic particles to be concentrated at another magnetic pole JJ formed at an end portion of another magnet J.

Considering that simple arrangement of another magnet J around the magnet J produces a monotonous stereoscopic pattern P on the vessel V, the third embodiment has another magnet J disposed on or under the magnet J to overlap with the magnet J, and thereby clear stereoscopic patterns P according to magnetic poles JJ formed at respective end portions of the magnets J can overlap with each other on the vessel V, as shown in FIG. 7, greatly increasing a commercial value of a product.

Preferably, according to the third embodiment, the apparatus includes a metal plate G disposed on or under the magnet J to overlap with the magnet J to be magnetized and thereby apply magnetic force to the coating substance to cause the magnetic particles to be concentrated at the magnetic poles GJ of the metal plates G formed at end portions of the metal plates G, as shown in FIG. 6B. Further, the metal plates G may include pattern holes H to form other magnetic poles GJ to additionally concentrate the magnetic particles by applying magnetic force to the coating substance when the metal plates G are magnetized by the magnets J, as shown in FIG. 6C.

In the case that the apparatus according to the third embodiment includes a metal plate G disposed on or under the magnet J to overlap with the magnet J to be magnetized and thereby apply magnetic force to the coating substance to cause the magnetic particles to be concentrated at the magnetic poles GJ of the metal plates G formed at end portions of the metal plates G, as shown in FIG. 6B, various stereoscopic patterns P according to the magnetic poles GJ of the metal plates G can be preferably produced on the vessel V in an overlapping manner along with maximization of the magnetizing forces of the metal plates G. In the case that the apparatus further includes metal plates G provided with the pattern holes H to form other magnetic poles GJ to additionally concentrate the magnetic particles by applying magnetic force to the coating substance when the metal plates G are magnetized by the magnets J, as shown in FIG. 6C, the magnetic poles GJ of the metal plates G formed at the end portions of the metal plates G are coordinated with the other magnetic poles GJ of the metal plates G formed around the pattern holes H, and thereby more various stereoscopic patterns P can be preferably produced on the vessel V in an overlapping manner.

Figure 8:
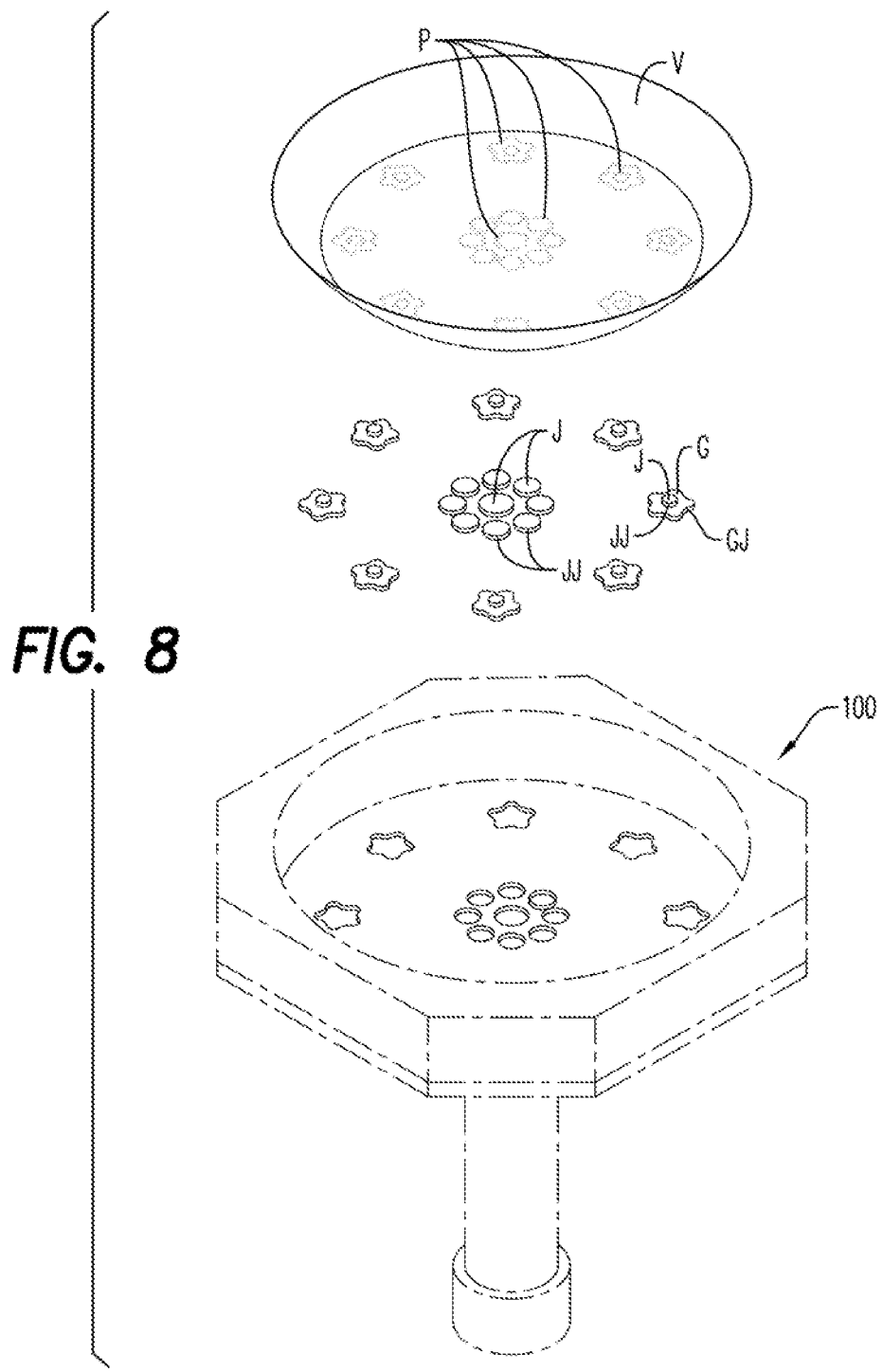
FIG. 8 is an exploded, top perspective view of an embodiment of a structure of an apparatus for coating kitchen vessels according to a fourth aspect of the present invention.
Figure 9:
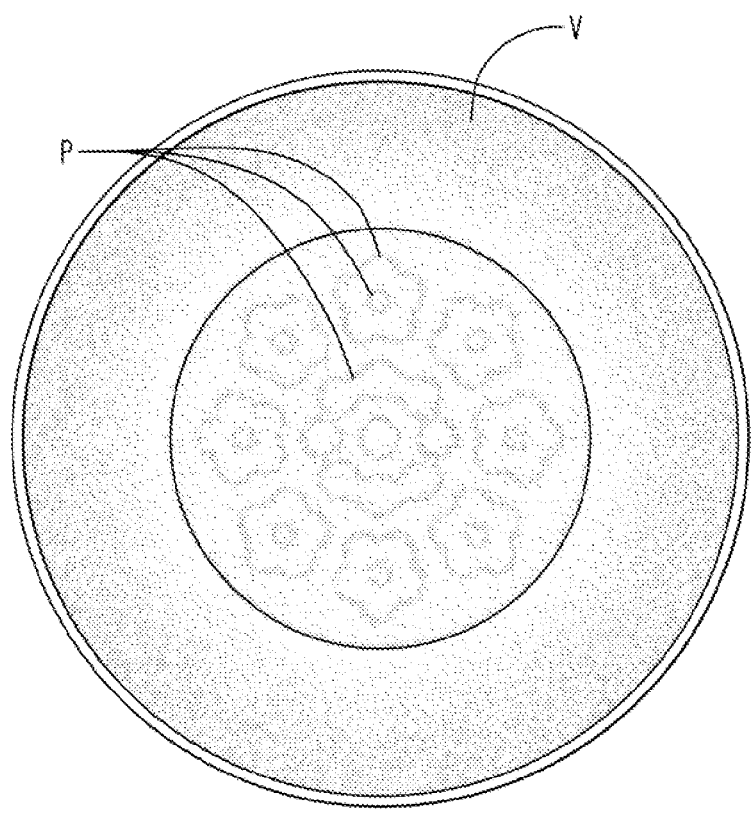
FIG. 9 is a photograph of a sample produced by the apparatus for coating kitchen vessels according to the fourth aspect of the present invention.

FIG. 8 is a view illustrating a structure of an apparatus for coating kitchen vessels according to a fourth embodiment of the present invention, and FIG. 9 is a picture of a sample produced by the apparatus for coating kitchen vessels according to the fourth, embodiment of the present invention.

As shown in FIG. 8, the apparatus for coating kitchen vessels according to the fourth embodiment of the present invention includes a jig 100 feeing a vessel V to which a coating substance containing magnetic particles is applied. The jig 100 may be disposed under or on the vessel V.

Considering that simple arrangement, of other magnets J around the magnets J produces a monotonous stereoscopic pattern P on the vessel V, the apparatus according to the fourth embodiment includes magnets J set on the jig 100 to face the vessel V and adapted to apply magnetic force to the coating substance to cause the magnetic particles to be concentrated at magnetic poles JJ of the magnets J formed at end portions of the magnets J, other magnets J set on the jig 100 to be disposed around the magnets J and face the vessel V and adapted to apply magnetic force to the coating substance to cause the magnetic particles to be concentrated at other magnetic poles JJ formed at end portions of the other magnets J, and metal plates G overlapping with the other magnets J to be magnetized and thereby apply magnetic force to the coating substance to cause the magnetic particles to be concentrated at magnetic poles GJ of the metal plates G formed at end portions of the metal plates G.

As the magnets K are simply disposed on the jig 100 and the other magnets J are disposed on or under the metal plates G to overlap with the metal plates G, simple stereoscopic pattern P and complex stereoscopic patterns P can be arranged in an overlapping manner as shown in FIG. 9, thereby greatly increasing a commercial value of a product.

The present invention can be employed in an industry in which stereoscopic patterns are produced on kitchen vessels such as frying pans, woks, pots and casserole pans which are used to broil or boil food.

As is apparent from the above description, the present invention can produce clear stereoscopic patterns on a vessel in an overlapping manner by disposing a magnet on a jig to overlap with a metal plate such that the metal plate is magnetized by actively accepting magnetic force of the magnet, and thereby the magnetic force according to magnetizing force of the metal plate is maximized to be as strong as the magnetic force of the magnet.

The present invention can produce stereoscopic patterns having different degrees of clarity on a vessel in an overlapping manner by maximizing the clarity of stereoscopic patterns formed by a magnetic pole of the magnet producing strong magnetic force and lowering the clarity of stereoscopic patterns formed by a magnetic pole of the metal producing relatively weak magnetic force.

The present invention can produce clear stereoscopic patterns on a vessel, in an overlapping manner by causing a magnetic pole of a metal to produce as strong magnetic force as the magnetic force of a magnet pole of a magnet to produce clear stereoscopic patterns.

The present invention can produce clear stereoscopic patterns having various degrees of clarity on a vessel in an overlapping manner by overlapping a magnetic pole of a magnet producing strong magnetic force and magnetic poles of a first metal plate and a second metal plate producing different weak magnetic forces.

The present invention allows magnetic poles of a metal plate to be formed not only at an end portion, i.e., an edge of the metal plate but also at an end portion of a pattern hole and thereby can produce various stereoscopic patterns on a vessel in an overlapping manner according to the number and shape of the pattern holes.

The present invention can produce clear and various stereoscopic patterns on a vessel in an overlapping manner as other magnets are disposed on or under a metal plate to overlap with the metal plate.

The present invention can produce various clear stereoscopic patterns on a vessel by overlapping a magnetic pole of a magnet having strong magnetic force produced by the magnet with magnetic poles of other metal plates having different weak magnetic forces produced by the other metal plates.

The present invention includes a metal plate provided with a through hole (a magnet may be fitted into the through hole, may be placed in the through hole formed to be larger than the magnet, or may be positioned under or on the through hole formed to be smaller than the magnet) and adapted to be magnetized and apply magnetic force to the coating substance to cause the magnetic particles to be concentrated at a magnetic pole of the metal plate formed at an end portion of the metal plate, and thereby can produce clearer stereoscopic patterns on the vessel V in an overlapping manner as the magnetic force according to the magnetizing force of the metal plate is maximized to be as strong as the magnetic force of the magnet.

The present invention has a magnet disposed on or under another magnet in an overlapping manner, and thus can produce clear stereoscopic patterns in a overlapping manner according to magnetic poles formed at respective end portions of the magnets, thereby greatly improving commercial value of a product.

The present invention can maximize the magnetizing force of a metal plate and produce various stereoscopic patterns on a vessel in an overlapping manner according to a magnetic pole of the metal plate.

The present invention allows a magnetic pole formed at an end portion of a metal plate to be coordinated with another magnetic pole of the metal plate formed around a patient hole, and thereby can produce various stereoscopic patterns on a vessel in an overlapping manner.

The present invention has a magnet simply disposed on a jig and another magnet disposed on or under a metal plate to overlap with the metal plate, and thus can produce simple stereoscopic patterns and complex stereoscopic patterns together on a vessel in an overlapping manner, thereby greatly improving commercial value of a product.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for coating kitchen, vessels including a jig facing a vessel to which a coating substance containing magnetic particles is applied the apparatus comprising:
    a magnet set on the jig to face the vessel and adapted to apply magnetic force to the coating substance to cause the magnetic particles to tie concentrated at a magnetic pole of the magnet formed at an end portion of the magnet; and
    a metal plate directly on top of or underneath and overlapping with the magnet to be magnetized and thereby apply magnetic force to the coating substance to cause the magnetic particles to be concentrated at a magnetic pole of the metal plate formed at an end portion of the metal plate.

2. The apparatus according to claim wherein the metal plate is disposed on the magnet to face the vessel.

3. The apparatus according to claim 1, wherein the magnet is disposed on the metal plate to face the vessel.

4. The apparatus according to claim 1, wherein the metal plate comprises a first metal plate and a second metal plate overlapping each other with the magnet placed therebetween.

5. The apparatus according to claim 1, wherein the metal plate comprises a pattern hole to form another magnetic pole of the metal plate to additionally concentrate the magnetic particles by applying magnetic force to the coating substance when the metal plate is magnetized by the magnet.

6. The apparatus according to claim 1, wherein another magnet is disposed on or under the metal plate to overlap with the metal plate.

7. The apparatus according to claim 1, wherein another metal plate is disposed on or under the metal plate to overlap with the metal plate.

8. An apparatus for coating kitchen vessels including a jig facing a vessel to which a coating substance containing magnetic particles is applied, the apparatus comprising:
    a magnet set on the jig to face the vessel and adapted to apply magnetic force to the coating substance to cause the magnetic particles to be concentrated at a magnetic pole of the magnet formed at an end portion of the magnet; and
    a metal plate directly on top of or underneath and overlapping with the magnet, the metal plate being provided with a through hole facing the magnet to be magnetized and thereby apply magnetic force to the coating substance to cause the magnetic particles to be concentrated at a magnetic pole of the metal plate formed at an end portion of the metal plate.

9. The apparatus according to claim 8, wherein the metal plate comprises a pattern hole to form another magnetic pole of the metal plate to additionally concentrate the magnetic particles by applying magnetic force to the coating substance when the metal plate is magnetized by the magnet.

10. The apparatus according to claim 8, wherein another magnet is disposed on or under the metal plate to overlap with the metal plate.

11. The apparatus according to claim 8, wherein another metal plate is disposed on or under the metal plate to overlap with the metal plate.

12. An apparatus for coating kitchen, vessels including a jig facing a vessel to which a coating substance containing magnetic particles is applied, the apparatus comprising:
    a magnet set on the jig to face the vessel and adapted to apply magnetic force to the coating substance to cause the magnetic particles to be concentrated at a magnetic pole of the magnet formed at an end portion of the magnet;

another magnet disposed on or under the magnet to overlap with the magnet to apply magnetic force to the coating substance to cause the magnetic particles to be concentrated at another magnetic pole formed at an end portion of the another magnet; and a metal plate disposed directly on top of or underneath the magnet to overlap with the magnet to be magnetized and thereby apply magnetic force to the coating substance to cause the magnetic particles to be concentrated at a magnetic pole of the metal plate formed at an end portion of the metal plate.

13. The apparatus according to claim 12, wherein the metal plate comprises a pattern hole to form another magnetic pole of the metal plate to additionally concentrate the magnetic particles by applying magnetic force to the coating substance when the metal plate is magnetized by the magnet.

14. An apparatus for coating kitchen vessels including a jig facing a vessel to which a coating substance containing magnetic particles is applied, the apparatus comprising:

a magnet set on the jig to face the vessel and adapted to apply magnetic force to the coating substance to cause the magnetic particles to be concentrated at a magnetic pole of the magnet formed at an end portion of the magnet;

another magnet disposed around the magnet and set on the jig to face the vessel to apply magnetic force to the coating substance to cause the magnetic particles to be concentrated at another magnetic pole formed at an end portion of the another magnet; and a metal plate directly on top of or underneath and overlapping with the another magnet to be magnetized and thereby apply magnetic force to the coating substance to cause the magnetic particles to he concentrated at a magnetic pole of the metal plate formed at an end portion of the metal plate.

15. The apparatus according to claim 14, wherein the metal plate is disposed on or under the another magnet.

* * * * *